US007685025B2

(12) United States Patent
Islam

(10) Patent No.: US 7,685,025 B2
(45) Date of Patent: Mar. 23, 2010

(54) WEB-BASED INTEGRATED EVENT PLANNING AND MANAGEMENT SYSTEM AND METHOD

(76) Inventor: Shazed Islam, 6269 Willowfield Way, Springfield, VA (US) 22150

( * ) Notice: Subject to any disclaimer, the term of this patent is extended or adjusted under 35 U.S.C. 154(b) by 124 days.

(21) Appl. No.: 11/984,317

(22) Filed: Nov. 15, 2007

(65) Prior Publication Data

US 2008/0133286 A1 Jun. 5, 2008

Related U.S. Application Data

(60) Provisional application No. 60/858,967, filed on Nov. 15, 2006.

(51) Int. Cl.
*G06F 17/60* (2006.01)
(52) U.S. Cl. ...................................................... 705/27
(58) Field of Classification Search .................. 705/26, 705/27
See application file for complete search history.

(56) References Cited

U.S. PATENT DOCUMENTS

| 6,064,981 | A | 5/2000 | Barni et al. | |
| 6,463,419 | B1 | 10/2002 | Kluss | |
| 7,552,070 | B2 * | 6/2009 | Torres et al. | 705/26 |
| 2001/0037251 | A1 | 11/2001 | Nojima et al. | |
| 2002/0010648 | A1 | 1/2002 | Park et al. | |
| 2002/0010685 | A1 | 1/2002 | Ashby | |
| 2002/0128934 | A1 * | 9/2002 | Shaer | 705/27 |
| 2002/0194037 | A1 | 12/2002 | Creed et al. | |
| 2004/0204966 | A1 | 10/2004 | Duffey et al. | |
| 2006/0041446 | A1 | 2/2006 | Aaron | |
| 2006/0271381 | A1 * | 11/2006 | Pui | 705/1 |
| 2008/0092059 | A1 * | 4/2008 | White | 715/747 |

OTHER PUBLICATIONS theknot.com as archived on www.archive.org Jun. 6, 2006.*
"Here.Coms the Bride"; The Washington Post; Sec. F, pp. 1, 5, and 6; Jun. 11, 2006.

* cited by examiner

*Primary Examiner*—Jeffrey A Smith
*Assistant Examiner*—Courtney Stopp

(57) ABSTRACT

A web-based or computer-implemented system for planning and managing events such as weddings, bar mitzvahs, parties, and any other events involving multiple service providers or vendors including, but not limited to, caterers, entertainers, limousine drivers, and so forth, by means of a single website or portal and forms or contracts that can be customized to meet the service offerings, policy requirements, and pricing structures of individual providers or vendors.

18 Claims, 48 Drawing Sheets

:eMisha.com

Special Event Services begins Winter 2006.
Click here to see if the service is available in your area Home | Venues | Catering | Entertainment | Limos | Vendors' Directory | Shop Welcome, test.venues    Sign in/Sign out    My Events    My Account    Customer Support FEATURED ARTICLES : Party Decorations | Hot in Florals (Email Verification Pending)

My Account
Manage Account
Policies
Booking Requests
Additional Services
Upload Company Logo
Manage Venues
Payment History
Logout Help Tips Your Profile is Live.
Click here to Hide your Profile.

Tips

VM Tips 1 test
test tes tes tes test tes test test test
test tes tes tes test tes test test test
test tes tes tes test tes test test test
test tes tes tes test tes test test testtest tes tes tes test tes test test testtest tes tes tes test tes test
test testtest tes tes tes test tes test test testtest tes tes tes test tes test test testtest tes tes tes test
tes test test testtest tes tes tes test tes test test testtest tes tes tes test tes test test testtest tes tes
tes test tes test test testtest tes tes tes test tes test test testtest tes tes tes test tes test test test

Welcome to Member's Area

Account

View Company Profile    Edit Company Profile    Order Requests

Resources

Upload Company Logo    Manage Venue    Additional Services

Payment & Subscription

Payment Details    Payment History

Fig. 3

About eMisha | Terms of Use | Privacy Policy | Advertising | Jobs
Venues | Catering | Entertainment | Limos | Vendors' Directory | Shop | Tell a friend | Send feedback eMisha, AN SI GLOBAL ENTERPRISES, INC. is not responsible for content posted by users on this website and content on any external website linked from this website. ©
2006 eMisha. All rights reserved. Patent Pending.

OUR PROFESSIONAL MEMBERSHIPS

American Disc Jockey Association | National Limousines Association
Association for Wedding Professionals International | International Festivals & Events Association
International Special Events Society | National Association of Catering Executives | Professional Convention Management Association Partner sites:    Evite | eharmony | Weddingchannel | Brides | 1-800-Flowers | Expedia | Sandals | xFriday
Partypro | OrientalTrading | KidsPartyWorld | WindyCityNovelties | UltimatePartySupply

Fig-9

:€Misha.com

Special Event Services begins Winter 2006.
Click here to see if the service is available in your area Home | Venues | Catering | Entertainment | Limos | Vendors' Directory Welcome, test.caterer    Sign in/Sign out    My Events   My Account   Customer

FEATURED ARTICLES : Hot Appetizers | Catering Trends | Hot Party Cakes | Hot Beverages (Email Verification Pending)

My Account
Manage Account
Policies
Manage Menu
Professional Services
Booking Requests
Manage Media
Sample Order History
Payment History
Logout Help Tips Your profile is hidden.
Click here to make your Profile Live.

Tips

No Tips Found

---

Welcome To Member's Area

Account

View Company Profile    Edit Company Profile    Order Requests

Resources

Our Calendar    Upload Photos    Upload Video

My Menu and Services

Manage Menu    Professional Services

Payment and Subscriptions

Fig. 10

Payment Details     Payment History

About eMisha | Terms of Use | Privacy Policy | Advertising | Jobs
Venues | Catering | Entertainment | Limos | Vendors' Directory | Shop | Tell a friend | Send feedback eMisha, AN SI GLOBAL ENTERPRISES, INC. is not responsible for content posted by users on this website and content on any external website I
2006 eMisha. All rights reserved. Patent Pending.

OUR PROFESSIONAL MEMBERSHIPS

American Disc Jockey Association | National Limousines Association
Association for Wedding Professionals International | International Festivals & Events Association
International Special Events Society | National Association of Catering Executives | Professional Convention Management Asso Partner sites:    Evite | eharmony | Weddingchannel | Brides | 1-800-Flowers | Expedia | Sandals | xFriday
Partypro | OrientalTrading | KidsPartyWorld | WindyCityNovelties | UltimatePartySupply

Fig. 11

:eMisha.com

Special Event Services begins Winter 2006.
Click here to see if the service is available in your area Home | Venues | Catering | Entertainment | Limos | Vendors' Directory | Shop Welcome, test.caterer        Sign in/Sign out        My Events    My Account    Customer Support FEATURED ARTICLES : Hot Appetizers | Catering Trends | Hot Party Cakes | Hot Beverages (Email Verification Pending)

My Account
Manage Account
Policies
Manage Menu
Professional Services
Booking Requests
Manage Media
Sample Order History
Payment History
Logout Help Tips

Your profile is hidden.
Click here to make your Profile Live.

My Sample Order History

*No Sample Order Found*

Fig. 12

About eMisha | Terms of Use | Privacy Policy | Advertising | Jobs
Venues | Catering | Entertainment | Limos | Vendors' Directory | Shop | Tell a friend | Send feedback eMisha, AN SI GLOBAL ENTERPRISES, INC. is not responsible for content posted by users on this website and content on any external website linked from this website. ©
2006 eMisha. All rights reserved. Patent Pending.

OUR PROFESSIONAL MEMBERSHIPS

American Disc Jockey Association | National Limousines Association
Association for Wedding Professionals International | International Festivals & Events Association
International Special Events Society | National Association of Catering Executives | Professional Convention Management Association Partner sites:   Evite | eharmony | Weddingchannel | Brides | 1-800-Flowers | Expedia | Sandals | xFriday
Partypro | OrientalTrading | KidsPartyWorld | WindyCityNovelties | UltimatePartySupply

Special Event Services begins Winter 2006.
Click here to see if the service is available in your area eMisha.com

Home | Venues | Catering | Entertainment | Limos | Vendors' Directory | Shop

Welcome, test.caterer    Sign in/Sign out    My Events   My Account   Customer Support

FEATURED ARTICLES : Hot Appetizers | Catering Trends | Hot Party Cakes | Hot Beverages (Email Verification Pending)

My Account
Manage Account
Policies
Manage Menu
Professional Services
Booking Requests
Manage Media
Sample Order History
Payment History
Logout Help Tips

Your profile is hidden.
Click here to make your Profile Live.

Create Package

| Menu Heads | Picture | Menu Items | Packages |
|---|---|---|---|

Enter the Package Name and detail information, for example Elegant Dinner Buffet, Gala Seated Dinner, Classic Reception Buffet, etc.

Package Name     test pkg 1

Package Description     test pkg 1

Package Price     10 $

All of the Menu Head that you have entered in the previous section are shown under each Menu category. The number inside each parenthesis indicates the number of items available under this particular Menu Head. Please enter the number of items you plan to offer from these categories for the package above. If you do not wish to offer certain item for the package, you may leave it blank.

| Food Menu Items | Non-Alcoholic Beverage Items | Alcoholic Beverage Items |
|---|---|---|
| test m head (1)   1 | Not Found Any Items in Food Head | Not Found Any Items in Food Head |

About eMisha | Terms of Use | Privacy Policy | Advertising | Jobs
Venues | Catering | Entertainment | Limos | Vendors' Directory | Shop | Tell a friend | Send feedback eMisha, AN SI GLOBAL ENTERPRISES, INC. is not responsible for content posted by users on this website and content on any external website linked from this website. ©
2006 eMisha. All rights reserved. Patent Pending.

OUR PROFESSIONAL MEMBERSHIPS

American Disc Jockey Association | National Limousines Association
Association for Wedding Professionals International | International Festivals & Events Association
International Special Events Society | National Association of Catering Executives | Professional Convention Management Association Partner sites:    Evite | eharmony | Weddingchannel | Brides | 1-800-Flowers | Expedia | Sandals | xFriday
Partypro | OrientalTrading | KidsPartyWorld | WindyCityNovelties | UltimatePartySupply

FIG. 13

Special Event Services begins Winter 2006.
Click here to see if the service is available in your area Home | Venues | Catering | Entertainment | Limos | Vendors' Directory Welcome, test.caterer  Sign in/Sign out   My Events   My Account   Customer FEATURED ARTICLES : Hot Appetizers | Catering Trends | Hot Party Cakes | Hot Beverages (Email Verification Pending)

My Account
Manage Account
Policies
Manage Menu
Professional Services
Booking Requests
Manage Media
Sample Order History
Payment History
Logout Help Tips

Your profile is hidden.
Click here to make your Profile Live.

Caterer Menu Heads (Step 1)

| Menu Heads | Picture | Menu Items |
|---|---|---|

Food Menu Heads

Enter all the Food Menu Heads that you plan to offer, for example: Hors D'oeuvres, Pasta, Seafood, Appetizers, Poultry, Entrees, etc.

| Name | Description | Display | Ordering |
|---|---|---|---|
| test m head | test m head | Yes | 1 |

Alcoholic Beverage Menu Heads

Enter all the Alcoholic Beverage Menu Heads that you plan to offer, for example: W Drinks, etc.

*No Alcoholic Beverage Menu Head Found*

Non-Alcoholic Beverage Menu Heads

Enter all the Non-Alcoholic Beverage Menu Heads that you plan to offer, for exampl Juices, Teas, Hot Drinks, etc.

*No Non-Alcoholic Beverage Menu Head Found*

 

About eMisha | Terms of Use | Privacy Policy | Advertising | Jobs
Venues | Catering | Entertainment | Limos | Vendors' Directory | Shop | Tell a friend | Send feedback eMisha, AN SI GLOBAL ENTERPRISES, INC. is not responsible for content posted by users on this website and content on any external website li
2006 eMisha. All rights reserved. Patent Pending.

OUR PROFESSIONAL MEMBERSHIPS

American Disc Jockey Association | National Limousines Association
Association for Wedding Professionals International | International Festivals & Events Association
International Special Events Society | National Association of Catering Executives | Professional Convention Management Assoc Partner sites:  Evite | eharmony | Weddingchannel | Brides | 1-800-Flowers | Expedia | Sandals | xFriday
Partypro | OrientalTrading | KidsPartyWorld | WindyCityNovelties | UltimatePartySupply

Fig. 14

Special Event Services begins Winter 2006.
Click here to see if the service is available in your area Home | Venues | Catering | Entertainment | Limos | Vendors' Directory Welcome, test.caterer  Sign in/Sign out  My Events  My Account  Customer FEATURED ARTICLES : Hot Appetizers | Catering Trends | Hot Party Cakes | Hot Beverages (Email Verification Pending)

My Account
Manage Account
Policies
Manage Menu
Professional Services
Booking Requests
Manage Media
Sample Order History
Payment History
Logout Help Tips Your profile is hidden.
Click here to make your Profile Live.

Caterer Menu Item Images (Step2)

| Menu Heads | Picture | Menu Items |
|---|---|---|

Photos may not contain nudity, violent, or offensive material, or copyrighted im violate these terms your account will be deleted.

Image Path                    Image Description
[          ] Browse
Image Title
[                ]
Image Category [Menu Item ▼]

---

Image Path                    Image Description
[          ] Browse
Image Title
[                ]
Image Category [Menu Item ▼]

---

Image Path                    Image Description
[          ] Browse
Image Title
[                ]
Image Category [Menu Item ▼]

---

Image Path                    Image Description
[          ] Browse
Image Title

Fig. 15

Special Event Services begins Winter 2006.
Click here to see if the service is available in your area Home | Venues | Catering | Entertainment | Limos | Vendors' Directory | Shop Welcome, test.caterer    Sign In/Sign out    My Events    My Account    Customer Support FEATURED ARTICLES : Hot Appetizers | Catering Trends | Hot Party Cakes | Hot Beverages (Email Verification Pending)

My Account
Manage Account
Policies
Manage Menu
Professional Services
Booking Requests
Manage Media
Sample Order History
Payment History
Logout Help Tips Your profile is hidden.
Click here to make your Profile Live.

Caterer Menu Item (step3)

| Menu Heads | Picture | Menu Items | Packages |

Please Select the Menu Head from the drop-down box. Upon your selection, enter the item name and description.

Menu Head    test m head

Item Name

Item Description

Select the proper picture for the above item.

Picture    Select Image    NO IMAGE
(Add Menu Item Images)

Select the Catering Style, Cuisines, and Type of Menu in which the item above falls under.

Catering Style    Cuisine    Type of Menu
Butler    American (Regional)    Luncheon Menus

Fig. 17

About eMisha | Terms of Use | Privacy Policy | Advertising | Jobs
Venues | Catering | Entertainment | Limos | Vendors' Directory | Shop | Tell a friend | Send feedback eMisha, AN SI GLOBAL ENTERPRISES, INC. is not responsible for content posted by users on this website and content on any external website linked from this website. ©
2006 eMisha. All rights reserved. Patent Pending.

OUR PROFESSIONAL MEMBERSHIPS

American Disc Jockey Association | National Limousines Association
Association for Wedding Professionals International | International Festivals & Events Association
International Special Events Society | National Association of Catering Executives | Professional Convention Management Association Partner sites:    Evite | eharmony | Weddingchannel | Brides | 1-800-Flowers | Expedia | Sandals | xFriday
Partypro | OrientalTrading | KidsPartyWorld | WindyCityNovelties | UltimatePartySupply

Your Profile is Live.
Click here to Hide your Profile.

 

Payment Details    Payment History

About eMisha | Terms of Use | Privacy Policy | Advertising | Jobs
Venues | Catering | Entertainment | Limos | Vendors' Directory | Shop | Tell a friend | Send feedback eMisha, AN SI GLOBAL ENTERPRISES, INC. is not responsible for content posted by users on this website and content on any external website
2006 eMisha. All rights reserved. Patent Pending.

OUR PROFESSIONAL MEMBERSHIPS

American Disc Jockey Association | National Limousines Association
Association for Wedding Professionals International | International Festivals & Events Association
International Special Events Society | National Association of Catering Executives | Professional Convention Management Assc Partner sites:   Evite | eharmony | Weddingchannel | Brides | 1-800-Flowers | Expedia | Sandals | xFriday
Partypro | OrientalTrading | KidsPartyWorld | WindyCityNovelties | UltimatePartySupply

Your Profile Is Live.
Click here to Hide your Profile.

impossible or impractical such as acts of God, government advisory, civil disorder disa accidents, storm, strikes, inability to obtain suitable equipment or components, or curta transportation services or facilities, or similar causes beyond the control of Performer. Performer shall notify Customer as soon as possible as to the reason for the cancellati performance at the Event shall be cancelled. Performer shall have no further duty exce Customer's payment, in accordance with Performer's Cancellation Policy Option as se Performer's offer as accepted by Customer, as follows:

Force Majeure Type : [No Refund ▼]

Compensation : [ ]

Standard Vendor - Customer Agreement

Please review the industry standard booking agreement. This agreement comes with response to the Customer's request for a proposal. This agreement is designed to pro Vendor and the Customer. If you have any questions about the agreement, please co Account Manager.

Term & Conditions (Print Agreement)

> ### Vendor - Customer Agreement
>
> 1. Terms of Agreement
>
> 1.1. The details of the services to be rendered at your event are in accordance with the offer made in response to your inquiry through the eMisha website.

☐ I accept the agreement and terms.

About eMisha | Terms of Use | Privacy Policy | Advertising | Jobs
Venues | Catering | Entertainment | Limos | Vendors' Directory | Shop | Tell a friend | Send feedback eMisha, AN SI GLOBAL ENTERPRISES, INC. is not responsible for content posted by users on this website and content on any external website li
2006 eMisha. All rights reserved. Patent Pending.

OUR PROFESSIONAL MEMBERSHIPS

American Disc Jockey Association | National Limousines Association
Association for Wedding Professionals International | International Festivals & Events Association
International Special Events Society | National Association of Catering Executives | Professional Convention Management Assoc Partner sites: Evite | eharmony | Weddingchannel | Brides | 1-800-Flowers | Expedia | Sandals | xFriday
Partypro | OrientalTrading | KidsPartyWorld | WindyCityNovelties | UltimatePartySupply

Fig 31

FIG. 32 eMisha Caterer Registration Process

US 7,685,025 B2

WEB-BASED INTEGRATED EVENT PLANNING AND MANAGEMENT SYSTEM AND METHOD

This application claims priority of provisional U.S. Patent Application Ser. No. 60/858,967, filed Nov. 15, 2006.

BACKGROUND OF THE INVENTION

1. Field of the Invention

This invention relates to a web-based or computer-implemented system for planning and managing events such as weddings, bar mitzvahs, parties, and any other events involving multiple service providers or vendors including, but not limited to, caterers, entertainers, limousine drivers, and so forth, by means of a single website or portal and forms or contracts that can be customized to meet the service offerings, policy requirements, and pricing structures of individual providers or vendors.

The system and method of the invention enables an event planner or organizer (also known as a "client") who wishes to organize an event to contact, get quotes from, and contract with multiple vendors in a coordinated fashion. The multiple vendors may be from entirely different industries having different contracting practices, such as the above-mentioned caterers, musicians, and limousine drivers. The system and method of the invention accommodates different types of contracts and contract terms, while presenting the organizer a unified interface and method of payment, through the use of a unique "dynamic contract" protocol, payment distribution arrangement, and provision for participation or intervention by human "intermediaries" who recruit and negotiate with service providers or vendors, resolve disputes with clients, and perform management functions that in practice cannot be automated. Furthermore, the system and method of the invention provides vendors with increased flexibility in creating event packages by offering the customer lists of specific options that may be selected through the website. The customer is not limited to a fixed package selection with limited options but rather may, by way of example, build catering menus on an item-by-item basis while tracking costs for inclusion in a good faith estimate provided to the customer before booking.

In addition to providing an integrated event planning and managing system and method, the invention provides a hierarchical structure of locally-managed sites responsible to a central office that provides maximum flexibility and response to the needs of a particular community or area.

2. Description of Related Art

The method and system of the invention is intended to replace the traditional way of planning an event, in which the event planner or organizer must physically travel to individual contractors and/or phone, fax, and e-mail them to check availability and get quotes for the services required. These quotes must be manually reviewed and compared by event organizers in order to determine which vendors to select. After selecting one or more vendors, negotiations are carried out, contracts signed, and payment made to each individual vendor.

The process of planning an event thus requires the following steps carried out by the organizer of the event and individual vendors:

1. Organizer creates a plan
2. Organizer searches for vendors
3. Organizer contacts vendors
4. Vendors ask for organizer's requirements
5. Organizer provides information about event and his or her requirements
6. Vendors prepares and submits a proposal
7. Organizers repeats all the above again if he needs proposals from more vendors to compare
8. Organizer compares proposals received
9. Organizer negotiates with chosen Vendor
10. Vendors prepares contract/agreement
11. Organizer and vendor enter into contract
12. Organizer pays booking/signing amount to vendor for the event To date, it has not been possible to provide a single portal through which all of these functions can be carried out, enabling recruitment of different vendors and giving the vendors the flexibility to set terms and price in accordance with different industry contracting standards, provide estimates and engage in offline negotiations, and/or take into account local rules and taxes, and so forth, while at the same time maximizing convenience for the event planner or organizer by enabling all search, selection, and contracting to be carried out through a single integrated portal. The invention provides a combination of vendor-side flexibility and customer-side integration that previous proposals for web-based event planning have not even considered.

It is of course well-known to automate planning of events such as vacations, or to arrange for shipments of goods, through the use of websites that provide prices for different vendors. However, the sites are only required to provide a few standard options common to all vendors, such as hotel room bed options or rental car classes, and a fixed pricing structure common to all vendors of a particular type. The standard travel portals such as Expedia™ or Orbitz™ do not enable customization on the vendor's part with respect to service options or contract terms, and therefore offer only limited choices to the consumer. This might be appropriate in the context of travel planning, but is not adequate to meet the more complex requirements of event planning.

U.S. Patent Publication No. 2002/0128934, on the other hand, purports to offer a more "integrated" event planning website that can be used to coordinate and plan a variety of "events," such as weddings, parties, home improvement projects, and other "events" listed in paragraph [0170] on page 12. According to the description, the consumer submits a list of preferences to the "cybermediary," which returns to the consumer a list of service templates that match the submitted criteria. The exemplary service template illustrated in FIG. 1F lists wedding packages by style, price, distance, food, and other criteria. According to one embodiment, summarized in paragraph [0228] on page 13, the vendor may modify the price of services based on demand.

However, the system disclosed in the '934 publication still lacks sufficient flexibility to provide useful event planning assistance. On the vendor side, no provision is made for recruiting different vendors, or for enabling the vendors to set terms other than price, to provide estimates and offline negotiations, or to adapt to different industry contracting standards, local taxes, and so forth. Perhaps more critically, there is no recognition that vendor recruiting and contracting is best done locally, requiring a hierarchical structure of locally-managed sites (by an intermediary or intermediary) responsible to a central office.

On the consumer side, a disadvantage of the system disclosed in the '934 publication is that preferences must be predetermined, rather than being presented as browsable options. The consumer can select vendors that meet predetermined criteria, for example, but the consumer cannot select a vendor and then choose different options offered by the vendor, and the vendor cannot present the consumer with more than a fixed and limited set of options. There is no provision for food tasting, no limo pricing based on location, and so forth.

One of the ways that the present invention addresses this problem is through the use of the "dynamic contract," which allows vendors to fill in contact terms within a form or template that also includes standard contract language designed to protect the interests of the portal or website operator as well as of specific industry standards for the vendor's industry. While the broad concept of an online template into which vendors fill in contract terms appears to be disclosed in U.S. Pat. No. 6,064,981 (the '981 patent) and U.S. Pat. No. 6,463,419 (the '419 patent), these patents are limited to the context of cargo shipping/charters, and the forms are not adaptable for use in event planning.

Other patents and publications that may be of interest as background for the present invention include U.S. Patent Publication Nos. 2006/0041446, which discloses an "electronic arranger" for events including weddings, and U.S. Patent Publication No. 2004/0204966, which discloses funeral planning website as part of an overall "method of providing life insurance and funeral services." Background on systems that provide interfaces between consumers and vendors is provided by U.S. Patent Publication Nos. 2002/0010685, 2002/0010685, and 2001/0037251. In addition, the Washington Post business section for Sunday, Jun. 11, 2006, includes an extensive description of existing web-based planning services. Although perhaps simplifying certain event planning tasks, however, none of these systems provides a comprehensive event planning service that provides all of the flexibility of conventional event planning methods listed above and enables vendors to customize the offerings presented and both pricing and contract terms presented to their clients, as well as efficient automation-assisted human management of all of these functions.

SUMMARY OF THE INVENTION

It is accordingly an objective of the invention to provide an event planning and management system and method that overcomes the disadvantages of traditional event planning methods by providing:
  hybrid management;
  integrated venue, food, entertainment, and transportation booking;
  dynamic contracting; and
  integrated payment.

As detailed above, the traditional way of event management is a very difficult and unorganized process which is also very time-consuming as well. The problems are that (i) each customer has different requirements; and (ii) there are no industry wide standard packages that can be compared easily based on price versus services available.

The hybrid management, dynamic contracting, and integrated payment aspects of the invention are improvements to the vendor-side of the portal that ultimately optimize flexibility from the point of view of the vendor while maximizing the options available to the consumer. The hybrid management concept provides automated assistance for human-managed functions such as vendor recruitment, negotiations for commissions, and verification of credentials. The dynamic contracting concept includes the provision of templates or forms tailored to particular industries into which a vendor may input services and goods offered, pricing structures therefore, and contract terms which are then selectively presented to the potential clients through the website. Finally, the integrated payment concept provides for automated distribution of payments made by clients to the vendors according to individually negotiated payment terms. The system and method of the invention enables managers to monitor individual transactions to ensure that vendors are performing to agreed-upon standards, and to mediate disputes, and yet provides for automated set-up and presentation of vendor offerings, contract conditions, and payments.

On the other hand, the integrated venue, food, entertainment, and transportation booking provides a maximum number of options to the consumer based on the above mentioned input from individual vendors, to enable selection of every possible detail of an event, from individual menu selections and service options (waiter, bartender, etc.) to types of linens, as well as price and contract terms, all through the same portal using a convenient data input format, as will be explained in connection with screen shots various types of vendors. It is to be appreciated, however, that the examples provided herein, including pages for caterers, entertainers, venue selection, and transportation are not intended to be exclusive, and that the types of services or goods that could be provided by the system and method of the invention is limited only by the types of events that persons might wish to plan or organize.

The integrated event planning and management system and method of the invention thus enables event organizers and vendors to interact in the most efficient manner possible, by providing a website through which the organizer and vendor can carry out one or more of the following event planning steps (by way of example and not limitation):
  1. Organizer Searches for Vendors;
  2. Organizer compares and selects Vendors;
  3. Organizer Selects one of the available Packages or creates/builds a package;
  4. Organizer Provides information about event and makes a BOOKING REQUEST;
  5. Vendor provides final quote and confirms availability, Or Vendors Re ask for additional information and repeats all of the above;
  6. Organizer compares proposals received from other vendors contacted in same way;
  7. Organizer confirms one of these and makes deposit to confirm booking Or ask for additional information and repeats all the above again.

The option in step 3 of creating or building a package based on lists of specific items (such as dishes or menu items) offered by the vendor, rather than merely selecting between a limited number of available packages, offers a particularly attractive and powerful event planning tool that is unlike anything currently available.

In addition, the integrated portal of the invention may include additional features such as an on-line store for selling related products related to event planning, such as books or supplies, as well as other products that might be attractive to site visitors, thereby increasing customer convenience as well as providing an additional revenue stream for the website operator.

BRIEF DESCRIPTION OF THE DRAWINGS

FIGS. 2-33 are screen shots illustrating the manner in which vendors are enabled to customize offerings to clients.

DETAILED DESCRIPTION OF THE PREFERRED EMBODIMENTS

Figure 1:
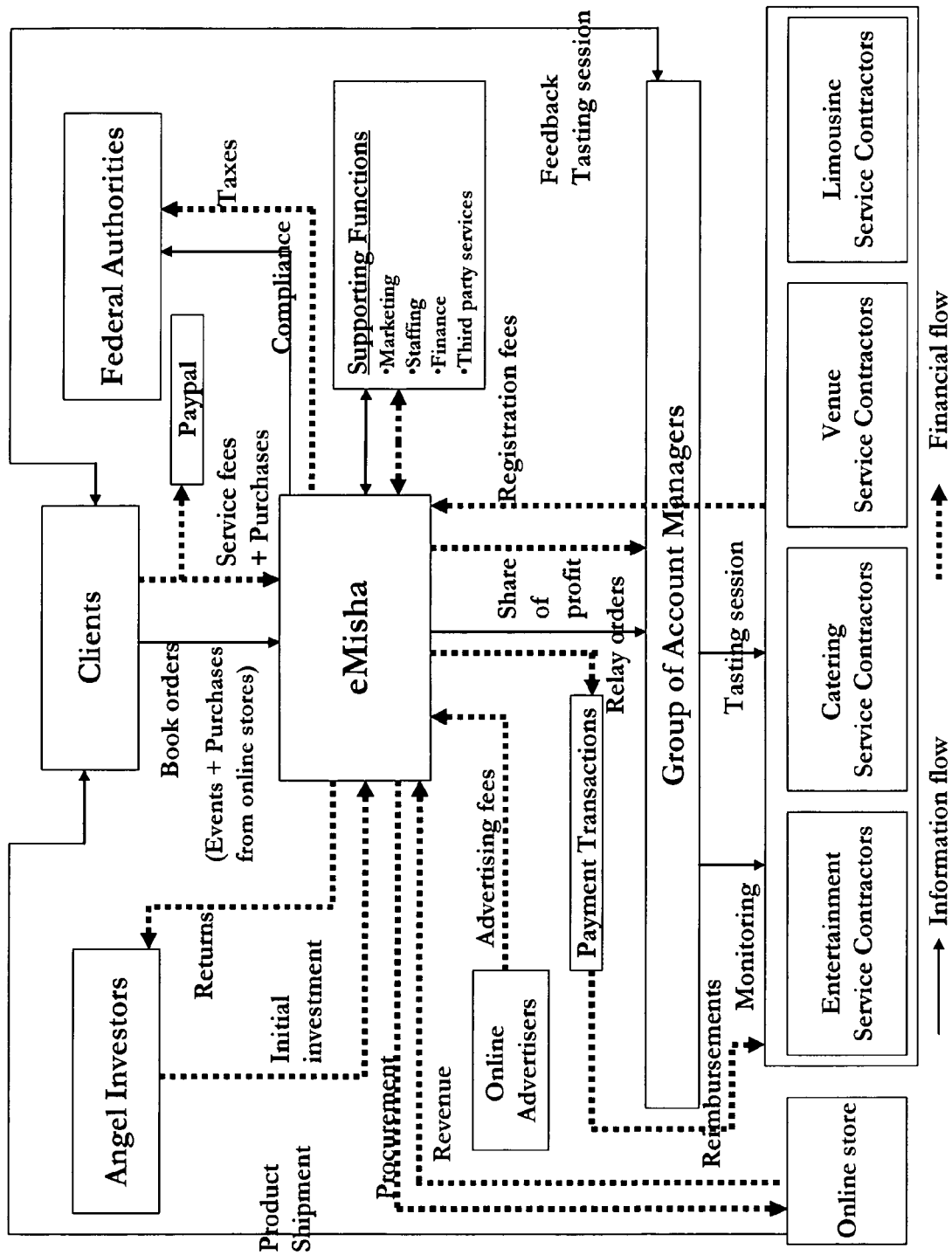
FIG. 1 is a block diagram of a system according to a preferred embodiment of the invention.

FIG. 1 is a block diagram of the overall event planning system of the invention, illustrating the various parties that are involved, including the operator of the system (referred to in FIG. 1 as eMisha), clients (customers who wish to use the service), and contractors (vendors who provide event-related services to be booked by the customers). This detailed description initially includes a description of the concept of hybrid management, which is the preferred model according to which the website operator is managed, a description of the customer interfaces, and a description of the contractor or vendor interface, represented by the screen shots of FIGS. 2-33. The remaining blocks related to investment, regulation, and supporting functions which form no part of the present invention except as might be noted below.

Before describing the interfaces with the customer and vendors, the concept of the "hybrid" model for the portal or website, and in particular the role of human "intermediaries" will be discussed. Like anything else in service industry, event management and related services are very complicated in nature. Customer needs and services provided by vendors are not fixed, and therefore it is a very difficult job to put everything on an Auto-Pilot website which can work without any manual participation. As a result, the system of the present invention utilizes a hybrid model in which various management and customer service functions are provided by human intermediaries assigned to specific areas, for example by Zip Codes. The intermediaries may also be referred to as "intermediaries," although their role is broader than just management of accounts since the intermediaries also serve as a go-between, broker, or facilitator between clients and vendors.

Intermediaries are responsible for acting as a bridge on behalf of the website of the invention, between customer and vendors. They understand the specific requirements from the customer and try to ensure that the customer gets all he has paid for by the vendor. The intermediary also makes sure that when a vendor is booked through the preferred website, the customer gets all the services that the vendor had mentioned in the itinerary booked by the customer.

By providing a unique hybrid system, i.e., an automated system with human oversight in the form of the above described intermediaries, as well as the dynamic contracting and integrated payment systems described below, the system of the invention can provide a single portal for researching, selecting, and contracting with a wide variety of services, including venue, food, transportation, and other services such as flowers. Furthermore, the provision of these services can be especially adapted to meet the particular requirements of the industries and vendors involved.

Intermediaries provide the human contact so critical to planning a successful event. Each intermediary is assigned a territory and is responsible for recruiting the vendors who will serve clients of the portal. Intermediaries must verify that each vendor meets standards of quality, must negotiate the commission that the vendor will be charged for use of the portal, and most importantly, must serve as liaison between clients and vendors. A good intermediary will coordinate the events, arrange for taste tests and event site tours, and keep vendors abreast of any changes requested by the customer. They may also be encouraged or possibly required to spend a minimum of few hours a week in marketing the website or portal of the invention through bridal shows, festivals, and local events. They are prohibited, however, from entering into personal contracts with clients. Intermediaries are compensated according to the amount of business generated, i.e., a fixed percentage of the vendor registration fees and a share of the commission per event serviced by their vendors.

The intermediary is the key to success of the integrated event planning system and method of the invention since he/she is the person who will be meeting clients and vendors on a regular basis. His responsibilities may include, but are not limited to:

Convincing Vendors to signup with the website or portal

Negotiating a percentage commission rate with the vendors which will be charged to the vendor when a booking is made through the website Follow up with clients and vendors when a new booking request is received and try to get the booking request converted to an order.

Follow up with sampling orders, check payments and venue site visits, etc.

Make sure that clients are satisfied clients and vendors get paid for the services provided.

Make sure that the credentials provided by the vendors are true and not misleading in any way.

Turning to the customer services provided by the site, once the clients have decided upon requirements for the event being planned, they can find out a list of venues that suit their requirements specifically with an easy to use search option available at the website.

Searching for venues is a very simple task on the preferred website. Initially, the customer can choose the type of event for which they are looking for a venue, e.g., wedding, bridal shower, birthday or a corporate seminar. Next, they select the type of Venue that they are looking for in case they have any preference (or else they can skip this step). Next they provide the date of event as per their plan and, optionally, they can choose the area where they prefer the venue to be located.

There are more options available under advanced search to find just the specific results and these advanced search criteria include room setup, capacity of party space, and area of venue in square feet, services allowed, parking space availability and amenities available.

Among the search results, they can click on any of the links available to view the venue profile which has details like 1. General Information about the Venue
2. All Party Spaces available at the Venue
3. Venue Rules and Regulations
4. Party Area
5. Amenities Available
6. Menus Available
7. Security Deposit Policy
8. Floor Plan
9. Seating Plan and Capacity Chart
10. Venue Photos and Videos
11. Packages available for Booking the Venue containing price, hours etc
12. Testimonials from other clients who booked this venue in past
13. Payment Policies.
14. Cancellation Policies
15. Other Additional Services offered by the Venues
16. Site Visit request form
17. Booking Request form which takes users to a Good Faith Estimate form All this information makes it easy for the customer to compare packages and additional services made available by the venue. Since the Good Faith Estimate requires a lot of information about the event, the information is protected for use by registered members of the website. Also to make the task easier for clients, clients are asked only once for information required to build the Good Faith Estimate only once and that information is saved in a database and can be used again and again to build Good Faith Estimates for other venues.

The Good Faith Estimate on the website is very comprehensive as that includes the base package, additional services, gratuity, sales tax, service tax and website service charges to get the final cost that will be paid by customer, without any hidden charges.

Once the visitor has gone through the process of comparing several different venues and the packages they offer, the visitor can send a booking request to the venue manager by joining the event planning website or portal as a registered member. Registered members get a few more benefits like their own personalized account area, and they can save as many events as they want in "My Events" section so that they are not required to fill in the event information each time they need to contact different service providers for the same event to get comparison quotes. The operator of the website may also send promotional offers to registered members which may be sent by email, text messages, and/or postal mail as well. Clients also get an option to change their personal details, email address, and password on file, and they can always see their complete order history and payment history by logging into their account area.

When the customer wishes to make a Booking Request, the website needs just a few details for registration and saving an event, such as name, email address, phone number and zip code to identify and contact the member in case any communication is required. To send a Booking Request for any service, a few details about the event and venue are required like 1. Event Name
2. Event Date
3. Event Duration
4. Event Location (Zip Code)
5. Location Type (Generally Used type of Venue)

In addition, further details may be required, such as:
1. Type of Space that customer is looking for (Ceremony, Party, Accommodation)
2. Setup Plan (Seating Style)
3. Venue Type (Hotels, Museums, Yachts etc.)
4. Floor Area required for Venue
5. Parking Requirements etc.

Once a member provides the above information, it is forwarded to the venue manager as a booking request along with the package selected by the customer to book a specific selected venue.

In case there are any additional details required by the service provider, the service provider can send a message to the customer or contact the intermediary who can arrange to obtain the information on behalf of the service provider by communicating with the customer.

Once all the information is available, the service provider can confirm the availability and final price for the package selected and customizations required as per the customer's needs. The service provider can do this by logging into his partner account at the website and this final quote is forwarded to the customer.

Once the final quote is received from the service provider, the customer is informed by email and/or text message and the customer can review the quote, make a final comparison and decision, and choose to accept the quote and proceed with payments or deny the quote and cancel the Booking Request. Some action is required from the customer within a suitable period such as 24 hours since the venue is on a tentative booking till the time the booking is confirmed or the quote is denied by the customer.

If the customer elects to accept the quote, he or she is sent to the payments and contracts screen where the customer can choose to pay by credit card or check payment. The amount to be paid at this time depends on the payment policies set by the vendor and can vary, by way of example and not limitation, from 10% to 100% depending on the date when the booking is made and the date of the event.

As soon as this advance payment is made, the booking request status changes to confirmed and the venue manager, intermediary, website administrator and customer are informed by email.

In case there is a second payment required, an alert email is sent to the customer a predetermined period such as 48 hours before the second payment is due so that this payment can also be made in time to keep the booking alive and confirmed.

In case of customer complaints, the matter will be handled by the accounts manager as a third party arbitrator until both the parties come to a mutual consent. The intermediary is responsible for checking that the contractor has completed all the duties he had committed to, preferably with limited responsibility on the part of the website operator. However, to maintain quality service for its clients/customers, the website operator may have the right to discontinue or disable any contractor at any point of time.

According to one payment option, the accounting department of the website operator makes payment to the contractor by bank transfer or PayPal, which is done manually and a record is maintained for any unique tracking number which can be seen by the contractor in his login area.

Alternatively, the contractor may elect to receive payment directly from the customer, in which case the contractor pays the website operator once the payment is received from the customer. To facilitate direct payment, vendors may be enabled at set-up to create a merchant account that can receive payments directly from the customer.

Turning to the caterer selection process, if the event requires catering and clients have all the requirements they planned for the event, they can obtain a list of catering companies that suit their requirements with an easy to use search option available at the website. The website may only allow catering companies which can cater at any location/venue that a customer chooses, although it is also within the scope of the invention to include catering companies that cater at more limited locations or venues.

Searching for catering companies is, like searching for venues, a very simple task on the website. The customer can choose the type of event for which they are looking for a caterer, such as a wedding, bridal shower, birthday or corporate seminar. Next, they can select the type of cuisine that they are looking for in case they have any preference or else they can skip this step. Next they provide the date of event as per their plan and, optionally, they can choose the area where they prefer the catering company to be located (zip code and number of miles), catering style, and menu type. Of course, it will be appreciated by those skilled in the art that additional choices or options may be presented, either under the regular search or in the form of an advanced search option. The advanced search criteria might include, for example, professional services provided by the catering company.

Upon obtaining the search results, the customer can click on any of the links available to view the catering company profile, which has details like:
1. General Information about the Catering Company
2. All Catering Packages available by the Catering Company
3. Catering Company Certification and Rules and Regulations
4. Professional Services Available
5. Food Menus Available and options for Food that clients call choose from
6. Security Deposit Policy
7. Food/Event Photos and Videos
8. Packages available for Booking the Catering Company containing Food, price, hours etc.
9. Testimonials from other clients who booked this Catering Company in the past
10. Payment Policies of Caterer
11. Cancellation Policies of Caterer
12. Sample Order form if available by the Caterer
13. Booking Request form which takes users to a Good Faith Estimate form.

All this information makes it easy for the customer to compare packages and additional services available from the catering company. Since the Good Faith Estimate requires a lot of information about the event, this information is protected to be used only by registered members of the website. Also, to make the task easier for the customer, information required to build the Good Faith Estimate is requested only once and that information is saved in a database so that it can be used again and again to build Good Faith Estimates by other catering companies on the website.

The Good Faith Estimate on the website is very comprehensive since it includes the base package, additional services, gratuity, sales tax, service tax and service charges to get the final cost that will be paid by the customer without hidden charges.

Once the visitor has gone through the process of comparing several different catering companies and packages they offer, the visitor can send a booking request to the catering company manager by joining the website as a registered member, as described above with respect to the venue selection process.

As with the venue Booking Request process, the website needs very few details for registration and saving an event, including name, e-mail address, phone number and zip code to contact the member in case a communication is required (and which may already have been entered during a previous Booking Request, such as for booking a venue. To send a Booking Request for any service a few details about the event and food preferences are required such as:
1. Event Name
2. Event Date
3. Event Duration
4. Event Location (Zip Code)
5. Cuisine and Food Selection
6. Service Staff Requirements
7. Location Type (Generally Used type of Venue)

Once a member provides the above information, it is forwarded to the catering company manager as a booking request along with the package selected by the customer to book a specific selected caterer.

In case there are any additional details required by the Service Provider, the service provider can send a message to the customer, or contact the intermediary who can arrange to obtain the information for the service provider as requested by communicating with the customer.

Once all the information is available, the service provider can confirm the availability and final price for the package selected, and any customizations required by the customer, by logging into his or her partner account at the website and this final quote is forwarded to the customer.

Once the final quote is received from the service provider, the customer is informed by email and/or text message. The customer can then review the quote, make a final comparison and decision, and choose to accept the quote and proceed with payments or deny the quote and cancel the Booking Request. Some action may be required from the customer within a predetermined period such as 24 hours since the caterer is on a tentative booking until the time the booking is confirmed or the quote is denied by the customer.

If the customer elects to accept the quote, the customer is sent to the payments and contracts screen where the customer can choose to pay by credit card or check payment. The amount to be paid depends on the payment policies set by the vendor and can vary from, for example, 10% to 100% depending on the date when the booking is made and the date of event.

As soon as this advance payment is made, the booking request status changes to confirmed and the catering company manager, intermediary, event planning system administrator, and customer are informed by email.

In case there is a second payment required, an alert email is sent to the customer a predetermined period, such as 48 hours, before the second payment is due so that this payment can also be made in time to keep the booking alive and confirmed.

As with venue selection, in case of customer complaints, the matter will be handled by the accounts manager as a third party arbitrator until both the parties come to a mutual consent. The intermediary is responsible for checking that the contractor has completed all the duties he had committed to, preferably with limited responsibility on the part of the website operator. However, to maintain quality service for its clients/customers, the website operator may have the right to discontinue or disable any contractor at any point of time.

Again, according to one payment option, the accounting department of the website operator makes payment to the contractor by bank transfer or PayPal, which is done manually and a record is maintained for any unique tracking number which can be seen by the contractor in his login area. Alternatively, the contractor may elect to receive payment directly from the customer, in which case the contractor pays the website operator once the payment is received from the customer. To facilitate direct payment, vendors may be enabled at set-up to create a merchant account that can receive payments directly from the customer.

Like searching for venues and caterers, searching for entertainers is a very simple task on the preferred website. The customer can again choose the type of event for which they are looking for a performer, such as a wedding, bridal shower, birthday or corporate seminar, and the type of Performer that they are looking for in case they have any preference. Next the customer needs to provide the date of event as per their plan and, optionally, can choose the area where they prefer the entertainer to be located.

In addition, more options may be provided under advanced search, including by way of example and not limitation, genre, style, themes and equipment etc.

Upon receiving the search results, the customer can click on any of the links available to view the entertainer profile, which has details like:
1. General Information about the Entertainer
2. All Option and Packages available by the Performer
3. Entertainer's Rules and Regulations 4. Play lists and Acts Available
5. Security Deposit Policy
6. Performance Photos and Videos
7. Packages available for Booking the Performer containing price, hours etc.
8. Testimonials from other clients who booked this Entertainer in the past
9. Payment Policies
10. Cancellation Policies
11. Other Additional Services offered by the Venues
12. Booking Request form, which takes users to a Good Faith Estimate form All this information makes it easy for the customer to compare packages and additional services available from the entertainers. Since the Good Faith Estimate requires a lot of information about the event, this information is protected for use by registered members of the website. Also to make the task easier for the customer, the customer is only asked for information required to build the Good Faith Estimate if it has not previously been provided, and the information is saved in the website's database for use again and again to build Good Faith Estimates by other Entertainers.

The Good Faith Estimate for entertainers is again very comprehensive and includes the base package, additional services, gratuity, sales tax, service tax and event planning system service charges to get the final cost that will be paid by the customer without any hidden charges.

Once a website visitor has gone through the process of comparing several different performers and packages they offer, the visitor can send a booking request to the band manager, entertainer, or agency, by joining the website or event planning system as a registered member, as described above in connection with venue and caterer selection.

During the Booking Request process, the website requests such details as name, email address, phone number and zip code, if they have not already been provided during, for example, venue or caterer booking, to identify and contact the member in case any communication is required. To send a Booking Request for any service a few details about the event and venue are required such as:
1. Event Name
2. Event Date
3. Event Duration
4. Event Location (Zip Code)
5. Location Type (Generally Used type of Venue)

To send an entertainer Booking Request, some additional details may be required such as:
1. Type of Performers that the customer is looking for (DJs, Solo Musicians, Variety Bands)
2. Special Requests (Playlists and Act requests)
3. Dress Code Once a member provides the above information, the information is forwarded to the band manager, entertainer, agency, or other entertainer contact as a booking request along with the package selected by the customer to book a specific selected entertainer.

In case there are any additional details required by the service provider, the service provider can send message to the customer or contact the intermediary as described above.

Once all the information is available, the service provider can confirm the availability and final price for the package selected and customizations required by logging into his or her partner account at the website and this final quote is forwarded to the customer.

Once the final quote is received from the service provider, the customer is informed by email and/or text message. The customer can then review the quote, make a final comparison and decision, and choose to accept the quote and proceed with payments or deny the quote and cancel the Booking Request. Some action may be required from the customer within a predetermined period such as 24 hours since the entertainer is on a tentative booking until the time the booking is confirmed or the quote is denied by the customer.

If the customer elects to accept the quote, the customer is sent to the payments and contracts screen where the customer can choose to pay by credit card or check payment. The amount to be paid depends on the payment policies set by the vendor and can vary from, for example, 10% to 100% depending on the date when the booking is made and the date of event.

As soon as this advance payment is made, the booking request status changes to confirmed and the band manager or other entertainer representative, the intermediary, the event planning system administrator, and the customer are informed by email.

In case there is a second payment required, an alert email is sent to the customer a predetermined period, such as 48 hours, before the second payment is due so that this payment can also be made in time to keep the booking alive and confirmed.

As with venue selection, in case of customer complaints, the matter will be handled by the accounts manager as a third party arbitrator until both the parties come to a mutual consent. The intermediary is responsible for checking that the contractor has completed all the duties he had committed to, preferably with limited responsibility on the part of the website operator. However, to maintain quality service for its clients/customers, the website operator may have the right to discontinue or disable any contractor at any point of time.

Again, according to one payment option, the accounting department of the website operator makes payment to the contractor by bank transfer or PayPal, which is done manually and a record is maintained for any unique tracking number which can be seen by the contractor in his login area. Alternatively, the contractor may elect to receive payment directly from the customer, in which case the contractor pays the website operator once the payment is received from the customer. To facilitate direct payment, vendors may be enabled at set-up to create a merchant account that can receive payments directly from the customer.

Searching for limousines (limos) or other transportation is another very simple task on the preferred website. The customer can again choose the type of event for which they are looking for a performer, such as a wedding, bridal shower, birthday or corporate seminar, and the type of Limo that they are looking for in case they have any preference. Next the customer needs to provide the date and time for pickup and date and time for arrival, along with locations as per their plan.

In addition, more options may be provided under advanced search, including by way of example and not limitation, Limo Features required.

After receiving the search results, the customer can click on any of the links available to view the Limo profile which has details like
1. General Information about the Limo Company
2. All Vehicles available at the Limo Company
3. Limo Provider's Rules and Regulations
4. Features available with Each Vehicle
5. Security Deposit Policy
6. Seating Capacity and Other Details about Vehicle
7. Vehicle Photos
8. Packages available for Booking the Vehicle containing price, hours etc 9. Testimonials from other clients who booked this Limo Provider in the past
10. Payment Policies
11. Cancellation Policies
12. Other Additional Services offered by the Limo Provider
13. Booking Request form which takes users to a Good Faith Estimate form All this information makes it easy for the customer to compare packages and additional services available from the Limo company. Since the Good Faith Estimate requires a lot of information about the event, this information is protected for use by registered members of the website. Also to make the task easier for the customer, the customer is only asked for information required to build the Good Faith Estimate if it has not previously been provided, and the information is saved in the website's database for use again and again to build Good Faith Estimates by other Limo companies.

The Good Faith Estimate for entertainers is again very comprehensive and includes the base package, additional services, gratuity, sales tax, service tax and event planning system service charges to get the final cost that will be paid by the customer without any hidden charges.

Once a website visitor has gone through the process of comparing several different Limo providers and the packages they offer, the visitor can send a booking request to the Limo company, by joining the website or event planning system as a registered member, as described above in connection with venue and caterer selection.

During the Booking Request process, the website requests such details as name, email address, phone number and zip code, if they have not already been provided during, for example, venue, caterer, or entertainer booking, to identify and contact the member in case any communication is required. As indicated above, to send a Booking Request for any service a few details about the event and venue are required such as:
1. Event Name
2. Event Date
3. Event Duration
4. Event Location (Zip Code)
5. Location Type (Generally Used type of Venue In addition, to send a Limo Booking request, some additional details that may be required include:
1. Type of Vehicle that the customer is looking for
2. Passenger Details
3. Additional Services Required
4. Source and Destination ZIP Codes and Date and Time Once a member provides the above information, it is forwarded to the Limo Provider as a booking request along with the package selected by the customer to book a specific selected vehicle.

In case there are any additional details required by the service provider, the service provider can send message to the customer or contact the intermediary as described above.

Once all the information is available, the service provider can confirm the availability and final price for the package selected and customizations required by logging into his or her partner account at the website and this final quote is forwarded to the customer.

Once the final quote is received from the service provider, the customer is informed by email and/or text message. The customer can then review the quote, make a final comparison and decision, and choose to accept the quote and proceed with payments or deny the quote and cancel the Booking Request. Some action may be required from the customer within a predetermined period such as 24 hours since the vehicle is on a tentative booking until the time the booking is confirmed or the quote is denied by the customer.

If the customer elects to accept the quote, the customer is sent to the payments and contracts screen where the customer can choose to pay by credit card or check payment. The amount to be paid depends on the payment policies set by the vendor and can vary from, for example, 10% to 100% depending on the date when the booking is made and the date of event.

As soon as this advance payment is made, the booking request status changes to confirmed and the Limo provider, the intermediary, the event planning system administrator, and the customer are informed by email.

In case there is a second payment required, an alert email is sent to the customer a predetermined period, such as 48 hours, before the second payment is due so that this payment can also be made in time to keep the booking alive and confirmed.

As described above, customer complaints will be handled by the accounts manager as a third party arbitrator until both the parties come to a mutual consent. The intermediary is responsible for checking that the contractor has completed all the duties he had committed to, preferably with limited responsibility on the part of the website operator. However, to maintain quality service for its clients/customers, the website operator may have the right to discontinue or disable any contractor at any point of time.

According to one payment option, the accounting department of the website operator makes payment to the contractor by bank transfer or PayPal, which is done manually and a record is maintained for any unique tracking number which can be seen by the contractor in his login area. Alternatively, the contractor may elect to receive payment directly from the customer, in which case the contractor pays the website operator once the payment is received from the customer. To facilitate direct payment, vendors may be enabled at set-up to create a merchant account that can receive payments directly from the customer.

To assist in searching for vendors, the website optionally may provide a vendors directory, which is a free listing feature for all type of vendors who wish to get listed on the website to increase sales by getting more exposure. Vendors may be given the option of allowing the customer to book the vendor's services directly through the website as described above, or of simply being listed as a vendor in the directory. The vendor may also be enabled to build a business profile using the directory. On the customer side, the website may provide visitors with an option to browse through the directory to find out all vendors for a particular category and can also make searches based on location and category to streamline the results for a particular area. For example one can make a search for all florists listed with the website who are within a range of 100 miles of 22079 (Lorton, Va.) by entering the zip code and distance and selecting a category of vendors that they are looking for.

Once the search is made, the user can go to the detailed listing page for any vendor which lists their contact numbers, services provided, service area and contact email address. The user can then choose to contact these vendors either by phone or email and all communications between the user and the contacted vendors are independent of the website, which does not record or follow-up any of the communications.

The operator of the preferred event planning system may also tie up with various drop shipping companies to offer products and services which are useful to website visitors. These products may be related but not limited to parties, celebrations like weddings, and gifts. The website may have a shopping area which offers a lot of options for such products, where users can shop for any item by searching by product code, a keyword based search, or browsing by category.

These products are preferably presented with other recommended products/options that the user might be interested in and users can add these products to their cart by clicking on a button. Once the product has been added to the cart, the user can continue browsing the store or choose to checkout and complete the order. At any point of time during browsing in the shopping area, the user can view the cart total and come back to the cart page to check the items in the cart and proceed with checkout.

Once the user is done after adding all the items they wish to purchase, they can checkout by registering with the website and providing the billing and shipping details with special instructions about the order. Once these details are provided, the user is sent to a payment processing company to complete the payment and the order status is changed to PAID as soon as a confirmation is received by the payment processing company.

Once the order status changes, a confirmation email is sent to the customer and drop shipping company confirming that a new order has been placed and the drop shipping company charges the website account and fulfils the order.

It will of course be appreciate by those skilled in the art that the customer side of the preferred website may include features other than those described above. For example, service providers or vendors may include services other than venue provision, catering, entertainment, and transportation. In addition, other web-based services, products, and features may be made available through the website.

Turning to the vendor side of the interface provided by the event planning system of the invention, after recruitment by the intermediary, the vendor is presented with a sign-up page that identifies the vendor and permits verification of credentials and basic information, some of which is used only by the website and some of which may be presented to clients. After sign-up, the vendor is presented with pages that permit customization of offerings, as well as filling in terms of the dynamic contract. These pages are illustrated in the accompanying Screen Shots.

The introductory vendor area explains how the website can help its partner (the vendor) market services better and also allows existing partners access to their login area. New partners go to the relevant section link which is available on this page. The next page explains how the website can be useful to the vendor's business to increase sales and, if the users are interested, they can click on Join Now button which takes them to the sign-up form.

The signup process is preferably as simple as possible while still providing the website with information that will be useful for clients. Information that may be requested (by way of example and not limitation) is as follows:

Step One of Three
Business Name
Slogan
Owner/CEO/Director Name

Contact Person at Venue
Business Phone Number
Account ID, which is the user id that is required at the time of login by this Venue Manager
Password, which is the login credential required by this Venue Manager at the time of login
Email Address, which is the email address which will be used for communication with this Venue Manager (this email address receives all notifications, booking requests and other instructions, mails, promotions from the website and registered/authorized senders)
Zip Code where the Venue is located
How did the vendor hear about the website
Three Past client names and numbers that can be used to verify the legitimacy of the details filled in by Service Provider to ensure that clients get quality service from the service providers.

Step Two of Three
Contact Number—here Venue Managers can fill in other contact numbers available with them which can be used by Intermediaries to contact them in case the primary contact numbers are not working.
Cell phone number to which Text Messages will be sent by the website for important notifications
Fax Number to send fax notifications to Vendors with Booking request details so that immediate action can be taken on these requests.
Website Address Step Two of Three
Doing Business Since
Street Address(es)
Sales Tax for Good Faith Estimate
Service Tax for Good Faith Estimate
Gratuity for Good Faith Estimate
About the Company This completes the signup application process and a verification code is immediately created and sent to the email address specified above for verification that the email address provided is correct and that the user has access to the email account.

Figure 2:

The venue manager is sent instructions by email with his or her activation code and activation page link which the venue manager can use to activate the account. The intermediary and webmaster can also see the information filled-in by the venue manager to enable contact and verification of the details and negotiate a commission percentage for the website or event planning service before the profile goes live. For example, FIG. 2 is a screen shot of a portal that shows all of the services offered at the website and a list of vendors under the intermediary's umbrella, and that provides the account management with management tools to carry out the functions described above.

Meanwhile, the venue manager can login to his or her account as an existing partner and can build packages, additional services, adding party spaces, etc., as illustrated in the attached screen shots (FIGS. 2-33). Text messages are used to inform the vendor when he or she has received a Request for Proposal, booking confirmation, payments, reminders, etc. Upon receipt of a text message, the vendor can login to his or her account and view details.

Figure 4:
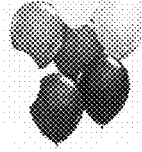
Figure 5:
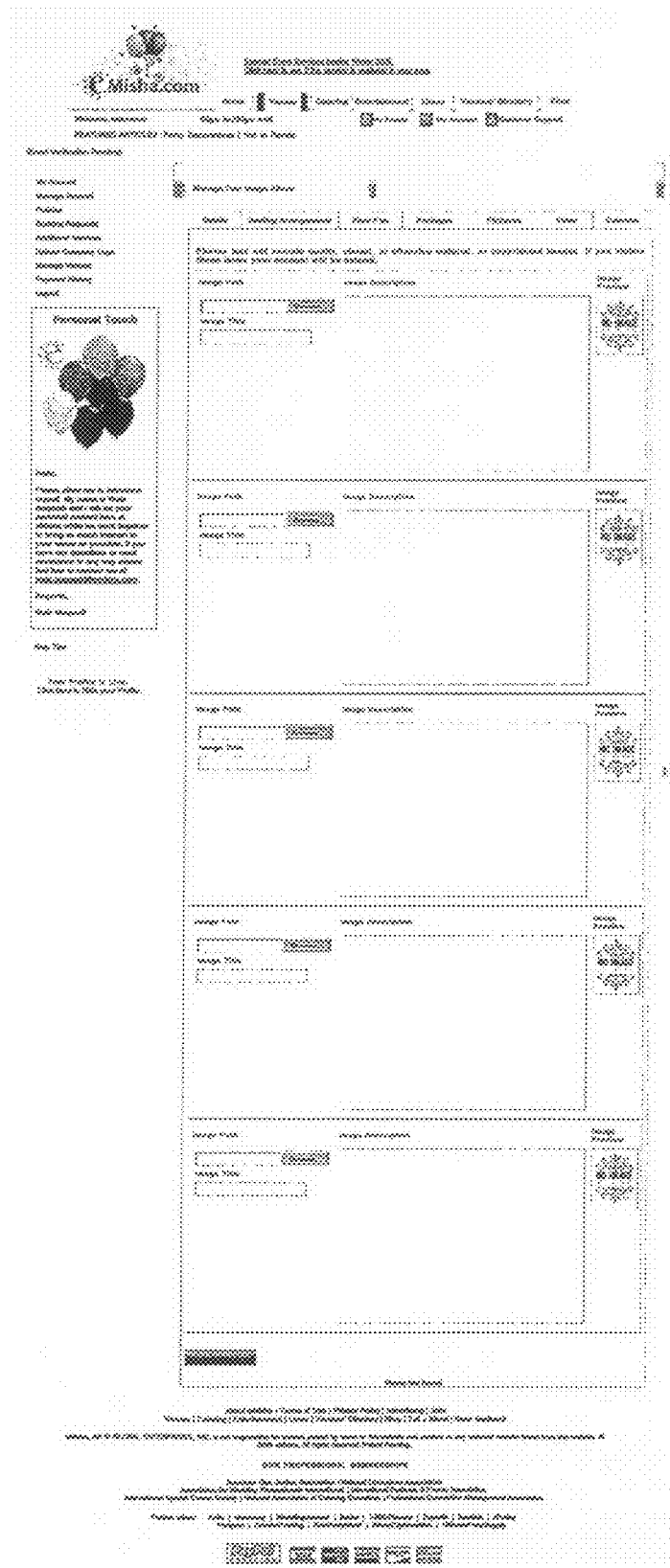
Figure 6:
Figure 7:
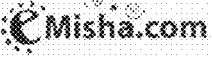
Figure 8:
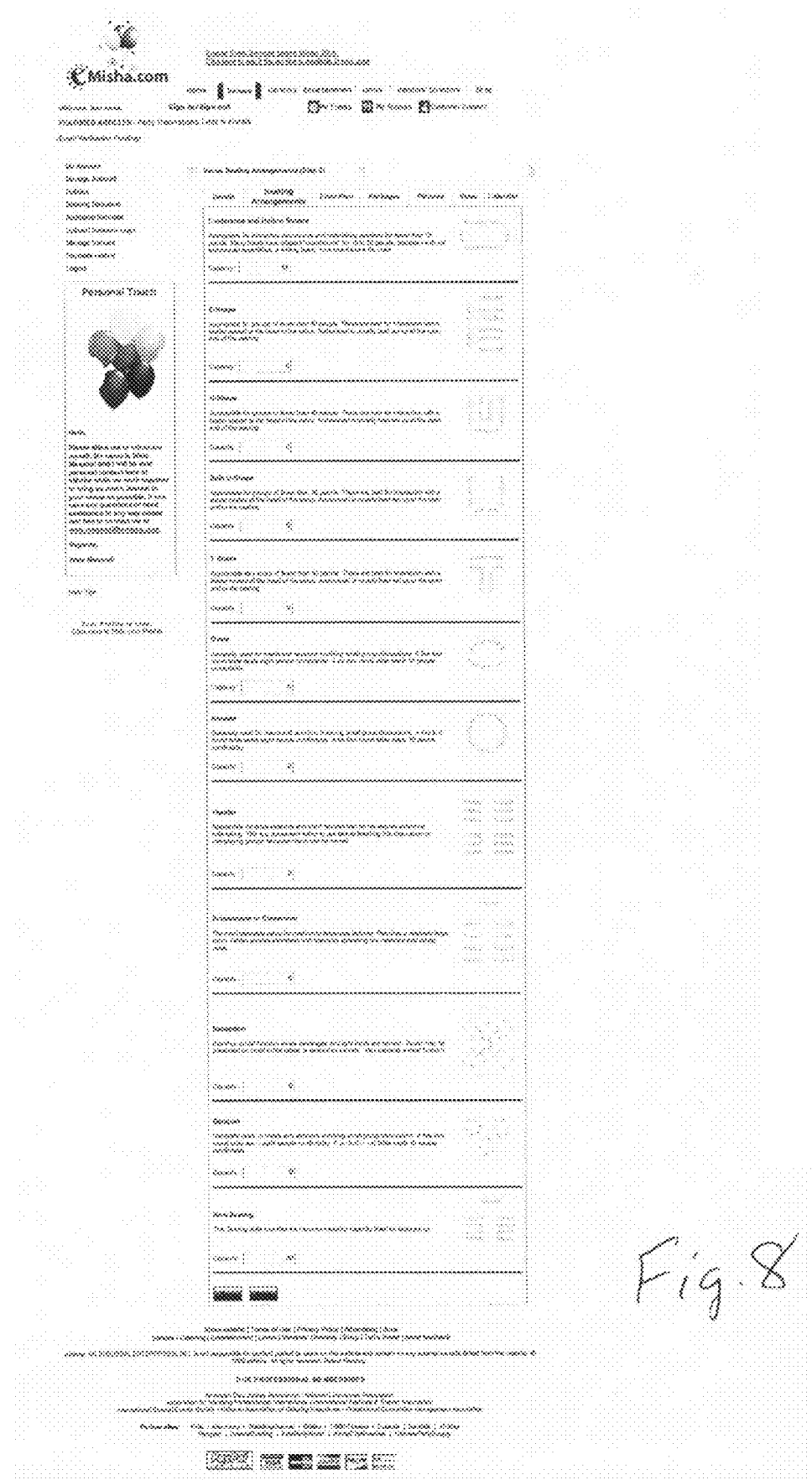
Figure 9:
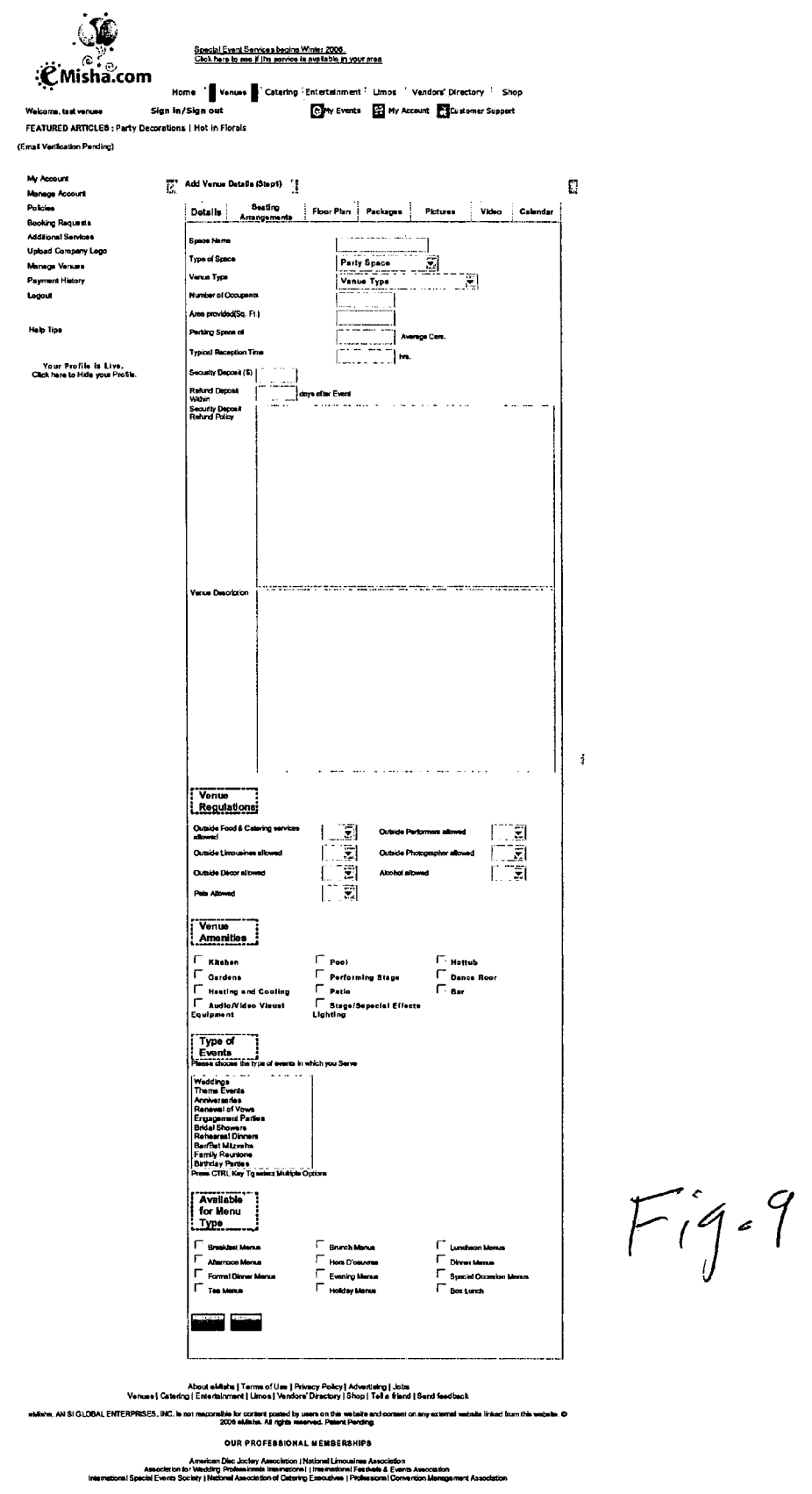
Figure 16:
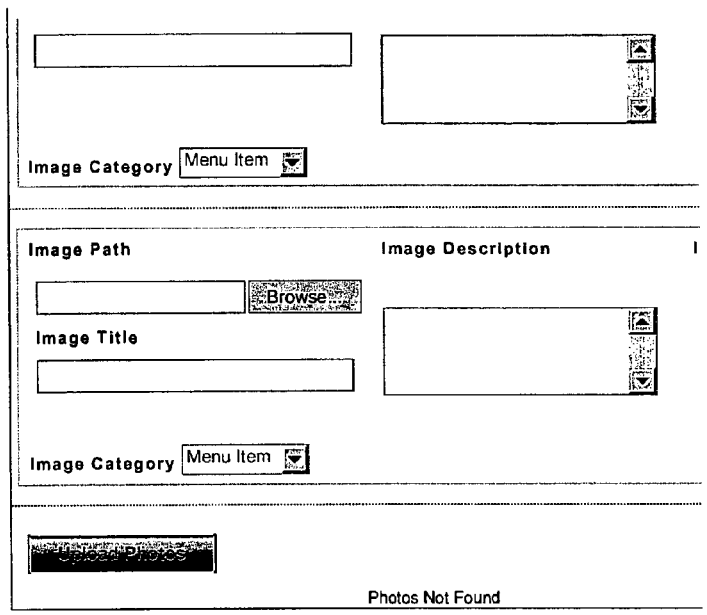
Figure 18:
Figure 19:
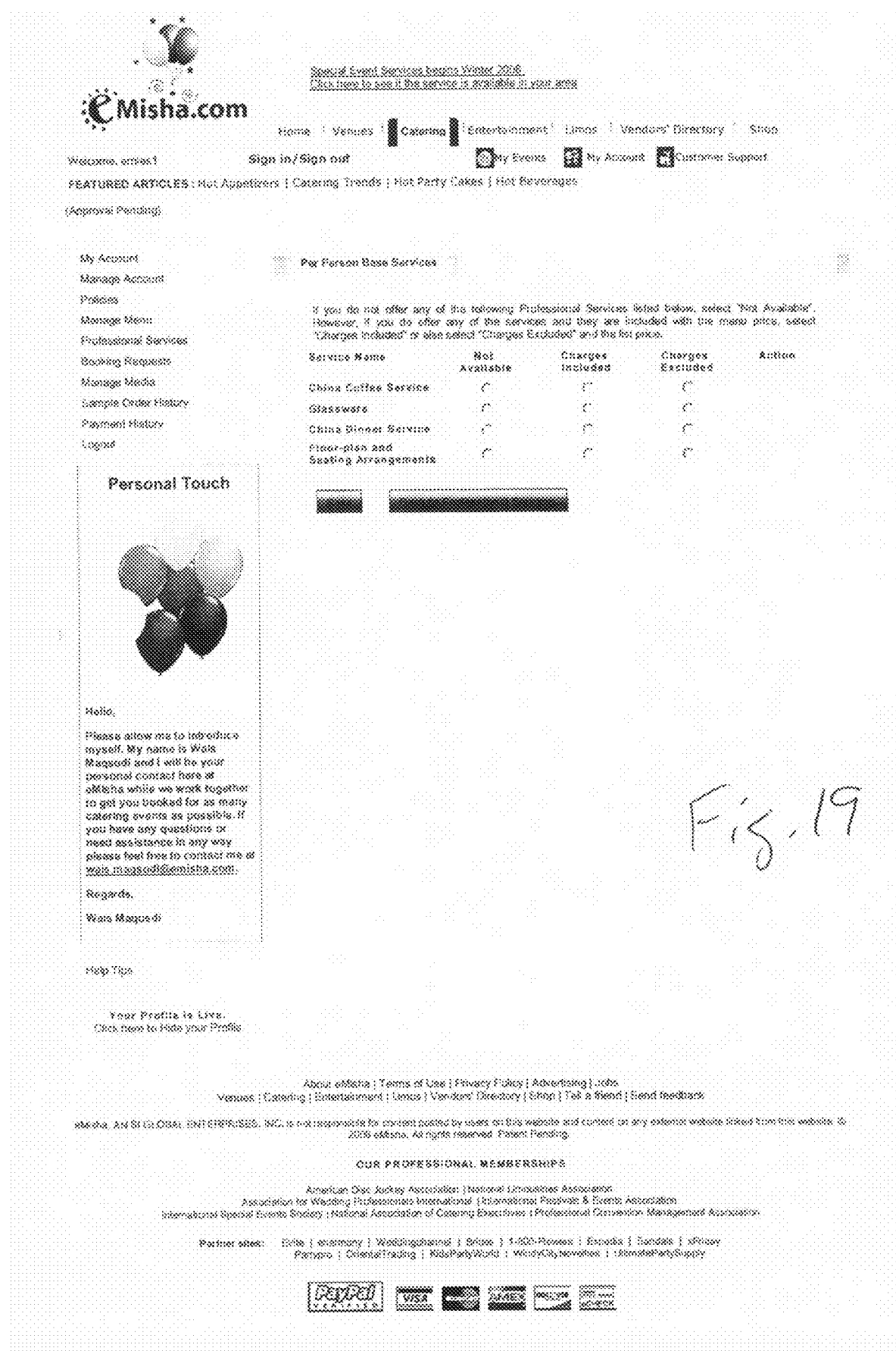
Figure 21:

Upon login, the vendor will be able to access pages for his or her particular type of vendors, such as the venue pages illustrated in FIGS. 3-9. Each set of vendor pages includes areas that permit the vendor to enter information appropriate to the type of service, with maximum flexibility for customization. For example, FIG. 4 shows that the venue manager can input days that are already booked, FIG. 5 permits the input of images of different venue locations, FIG. 6 is a page that permits the creation of packages include boxes for input of such information as base price, maximum number of hours, included hourly rate, and a package description, FIGS. 7 and 8 show a page that permits input of images and descriptions of seating arrangements, and FIG. 9 is a page that permits entry of other information such as venue regulations, amenities, and types of events.

Also by way of example, the caterer set-up/management area illustrated in the screen shots of FIGS. 10-23 include pages that permit set-up of packages including package names, descriptions, and prices (FIG. 13), setting up menus by categories or types of food offered ("menu heads") (FIG. 14), input of images such as pictures of menu items (FIGS. 15 and 16), input of specific menu items to be listed under the menu heads (FIGS. 17 and 18), and availability and charges for additional services or items that might be offered by the caterer, such as dishes, linens, furniture, ice sculptures, waiters, bartenders, and so forth. A notable feature of the caterer pages is the use of an incremental approach to pricing, i.e., base price plus pricing, that permits price comparison by clients.

Figure 24:
Figure 25:
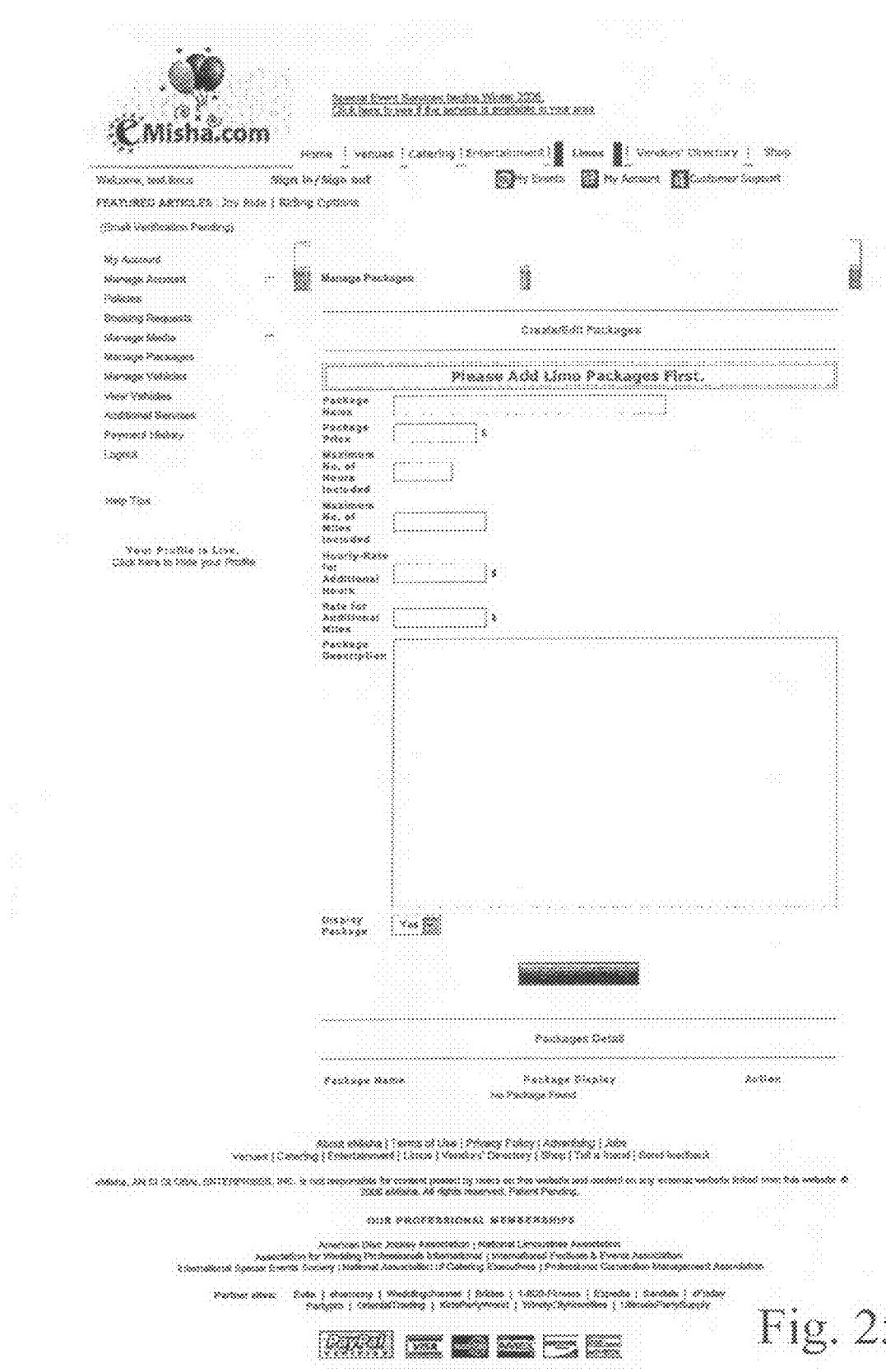
Figure 26:
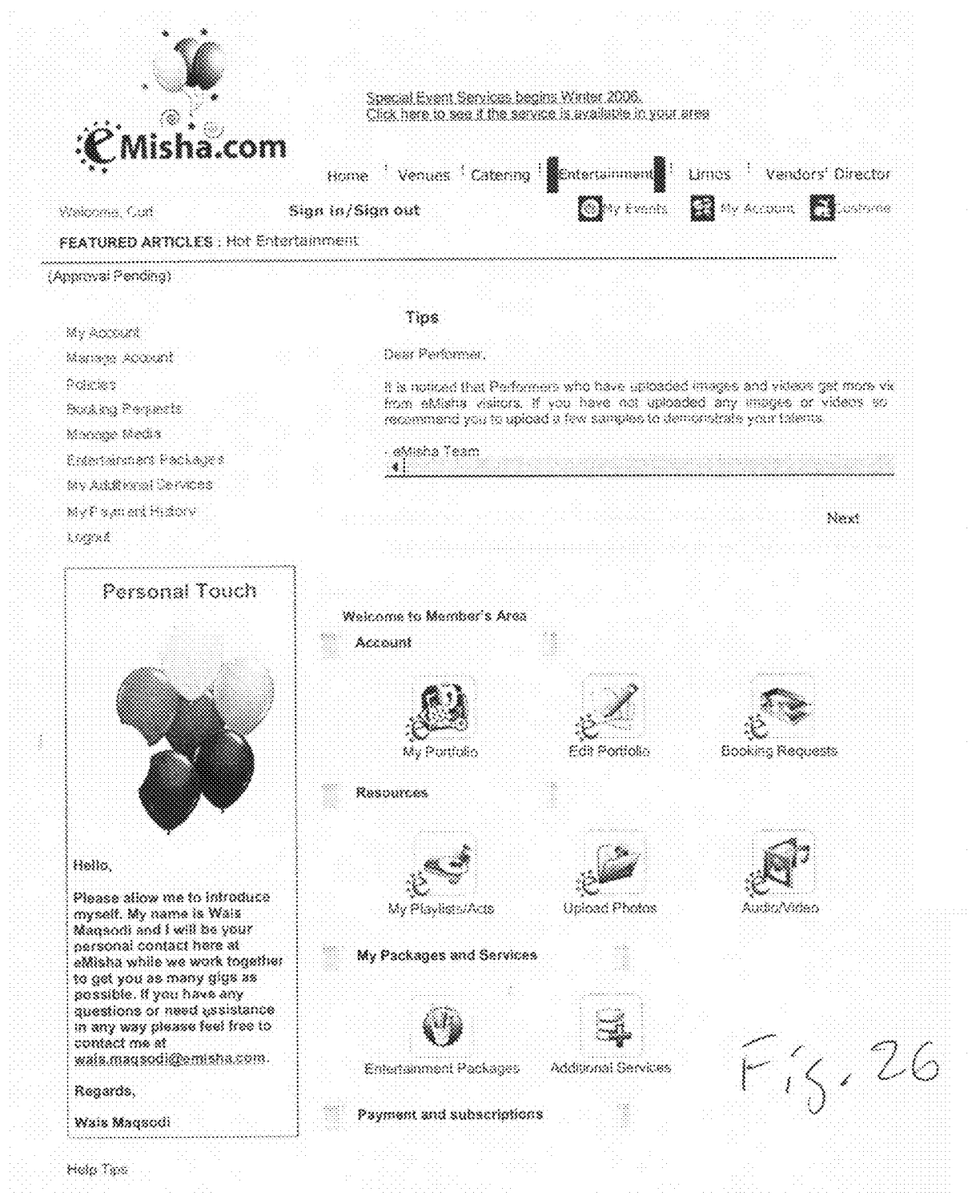
Figure 28:
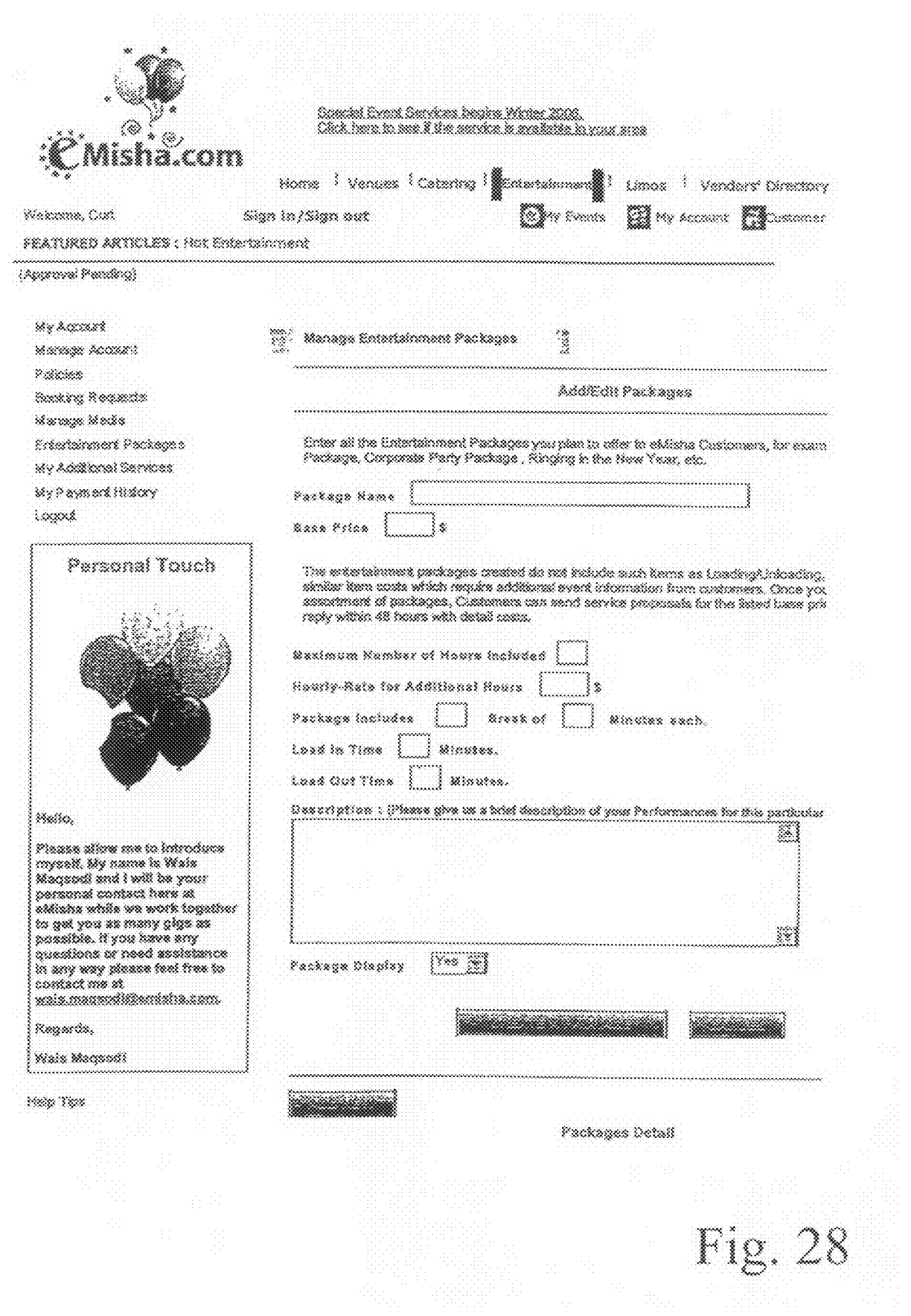
Figure 32:
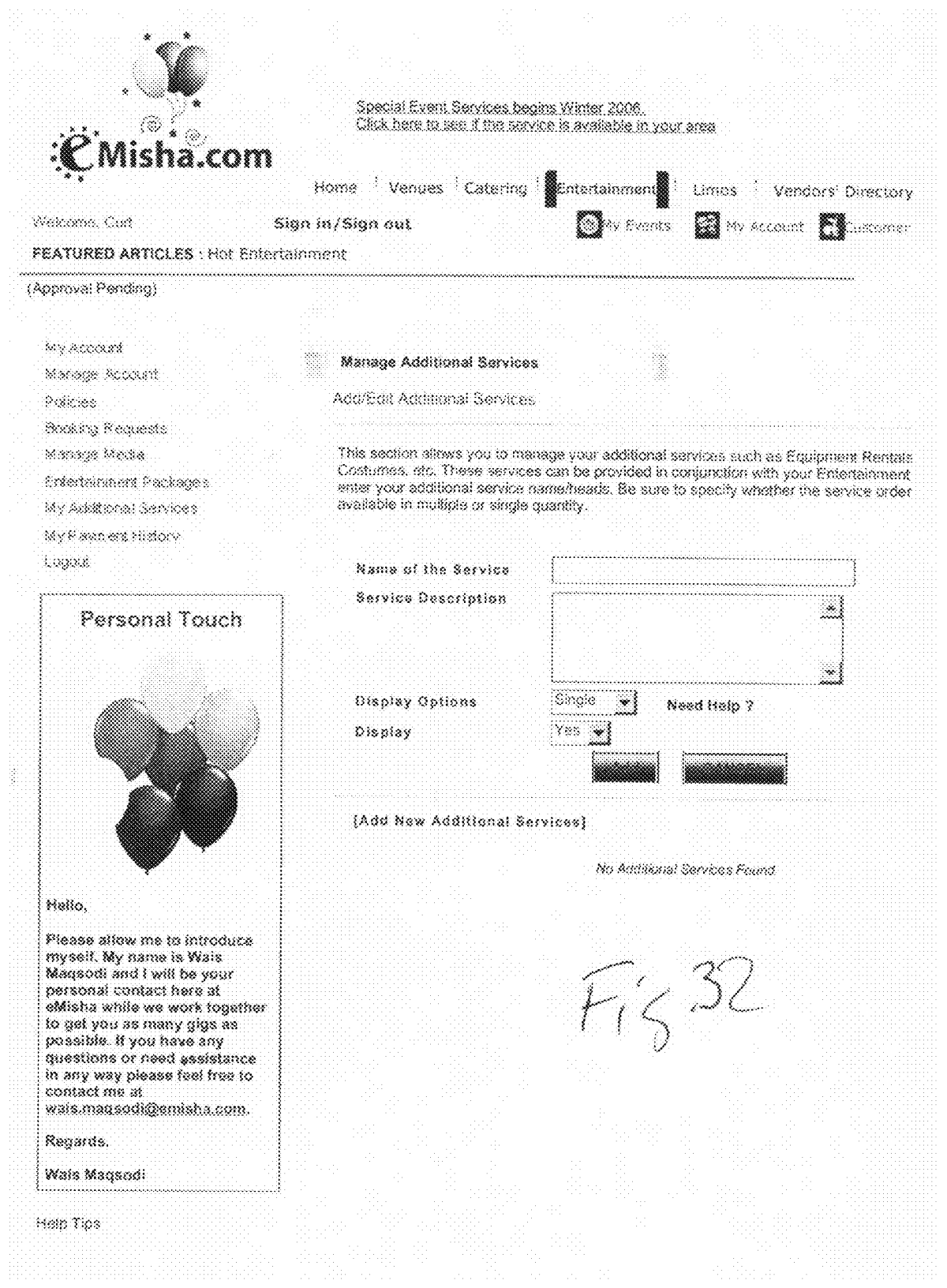

Similar set-up/management pages are presented to Limo companies, as shown in FIGS. 24 and 25, and entertainment managers/agencies as shown in FIGS. 26-31. Of particular interest in the illustrated entertainer pages is the ability to create packages tailored to the unique requirements of the entertainment industry, such as the ability to set break times, load in (set-up) and load out (take down) times, and so forth as illustrated in FIG. 28. FIG. 32 illustrates a page that enables the vendor to offer additional miscellaneous services, such as smoke machines, moon bounces, and so forth.

Figure 29:
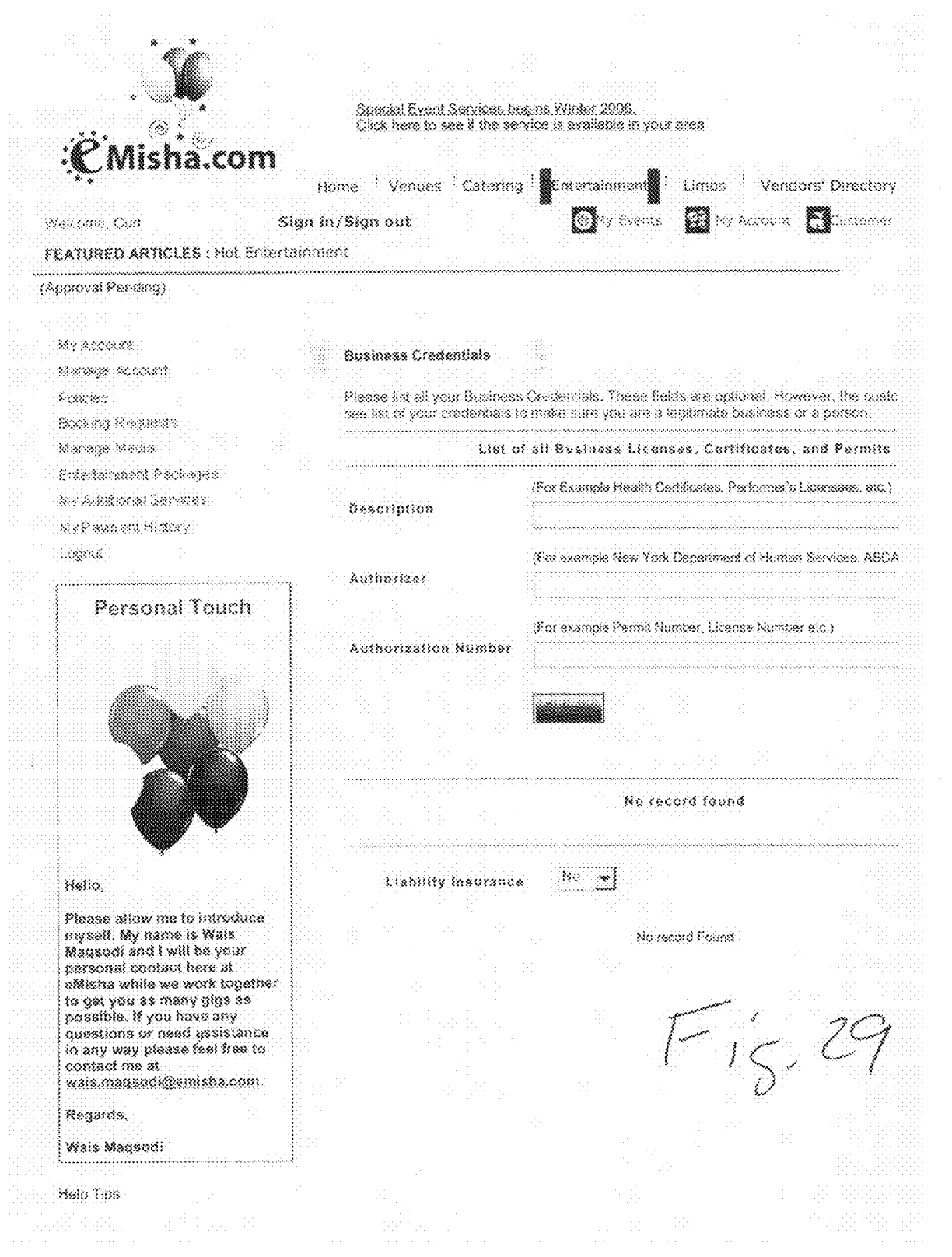

FIG. 29 illustrates a page through which an entertainment manager or agency may enter business credentials, such as license descriptions, authorizer, and number, which may optionally be presented to the customer in order to permit the customer to verify legitimacy or as required by law. A box for liability insurance might also be presented to the customer or hidden.

It will be appreciated by those skilled in the art that, like the customer interface, features may be added to the vendor pages without departing from the scope of the invention. For example, vendors may be able to put spider tag lines that attract hits on search services such as Google.

Figure 30:
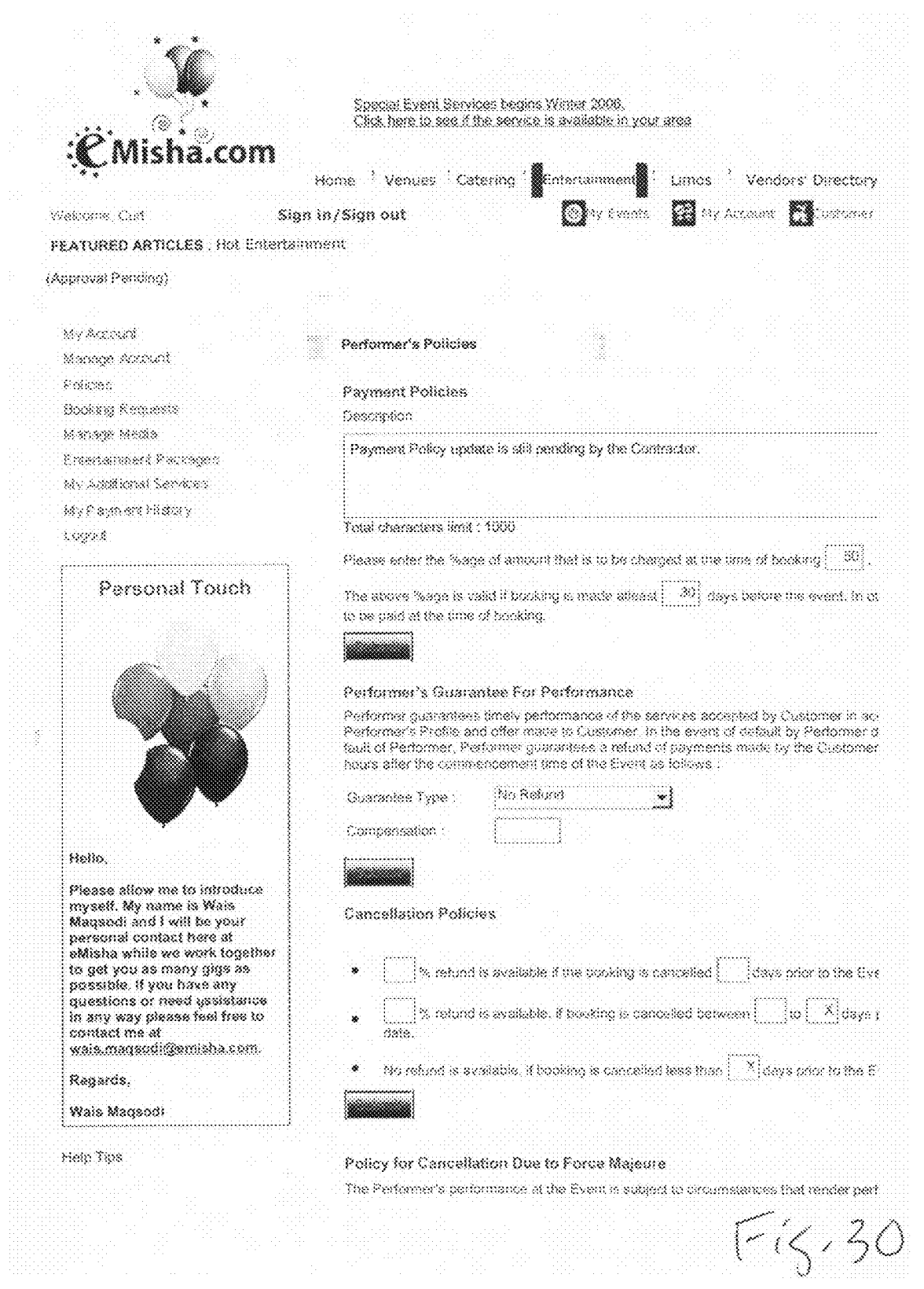

FIGS. 30 and 31 are pages that enable the performer, manager, or agency to enter policies and contract terms for presentation in a contract when the customer is ready to book the performer. This is the vendor side of the unique "dynamic contract" of the invention, which permits customization of various terms and policies while setting other terms and policies that cannot be changed by the vendor, and that have been pre-approved by the website's legal department.

Figure 33:
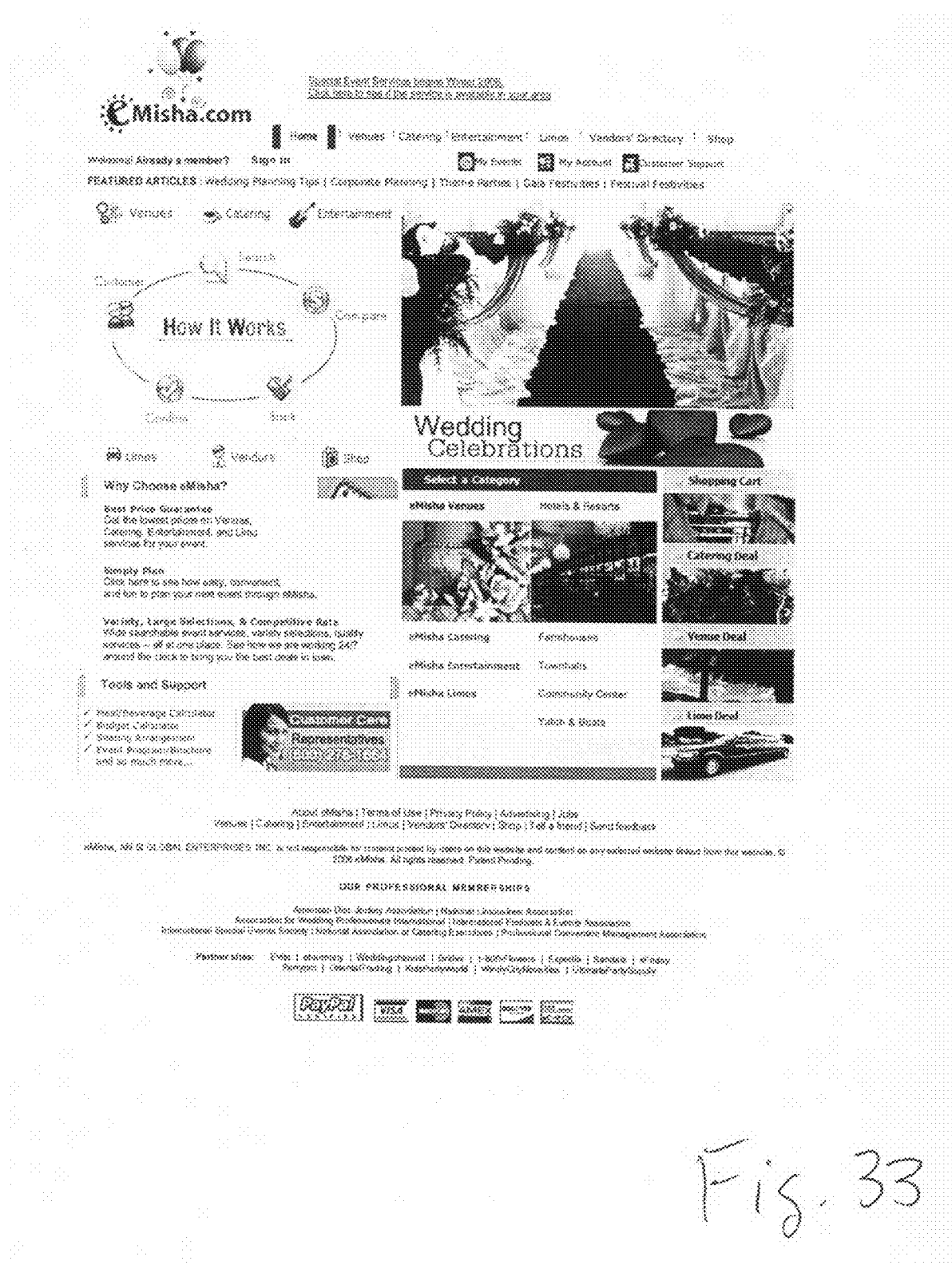
Figure 34:
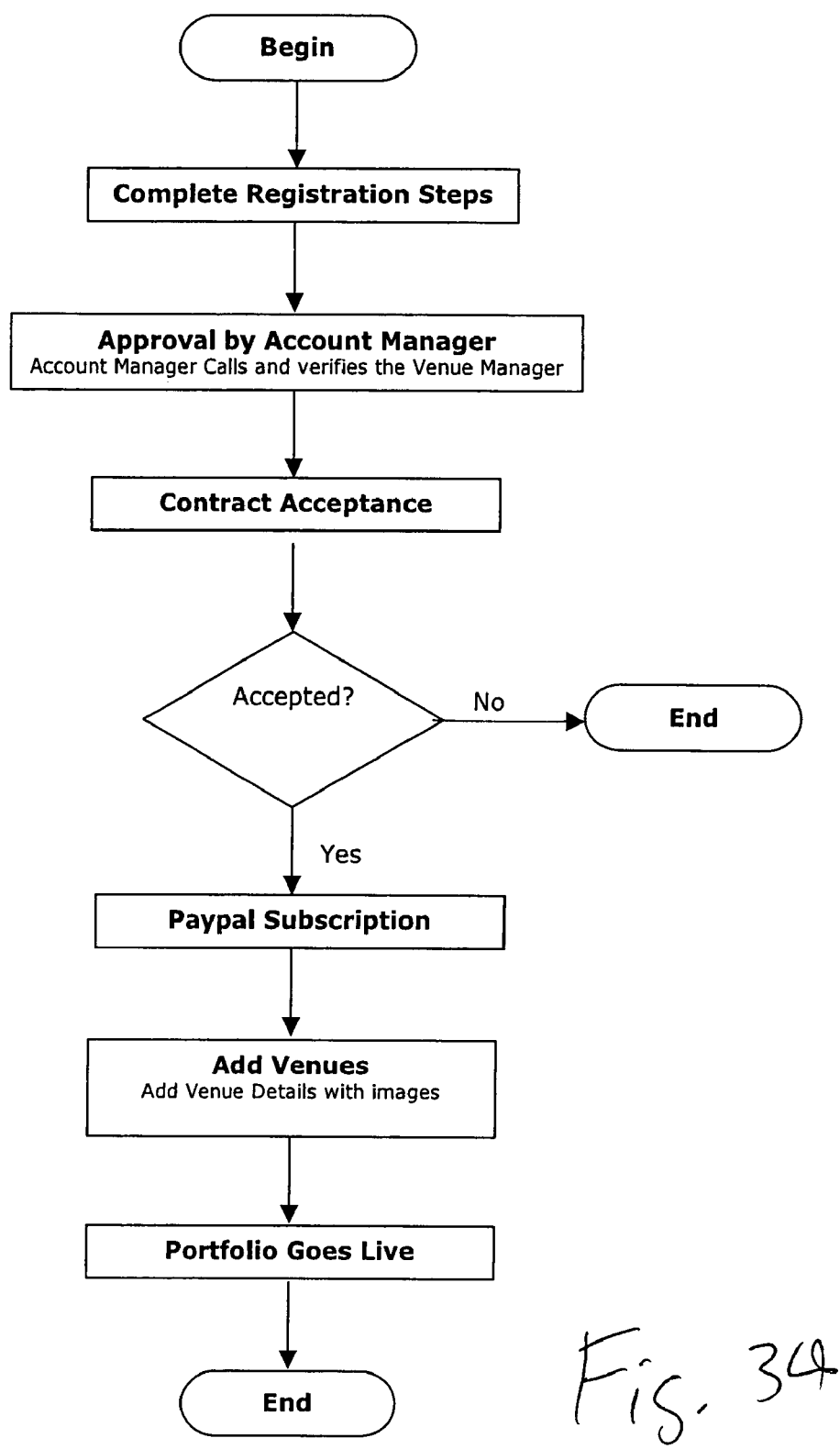
FIGS. 34-47 are flowcharts summarizing vendor and customer side processes for implementing the invention.
Figure 35:
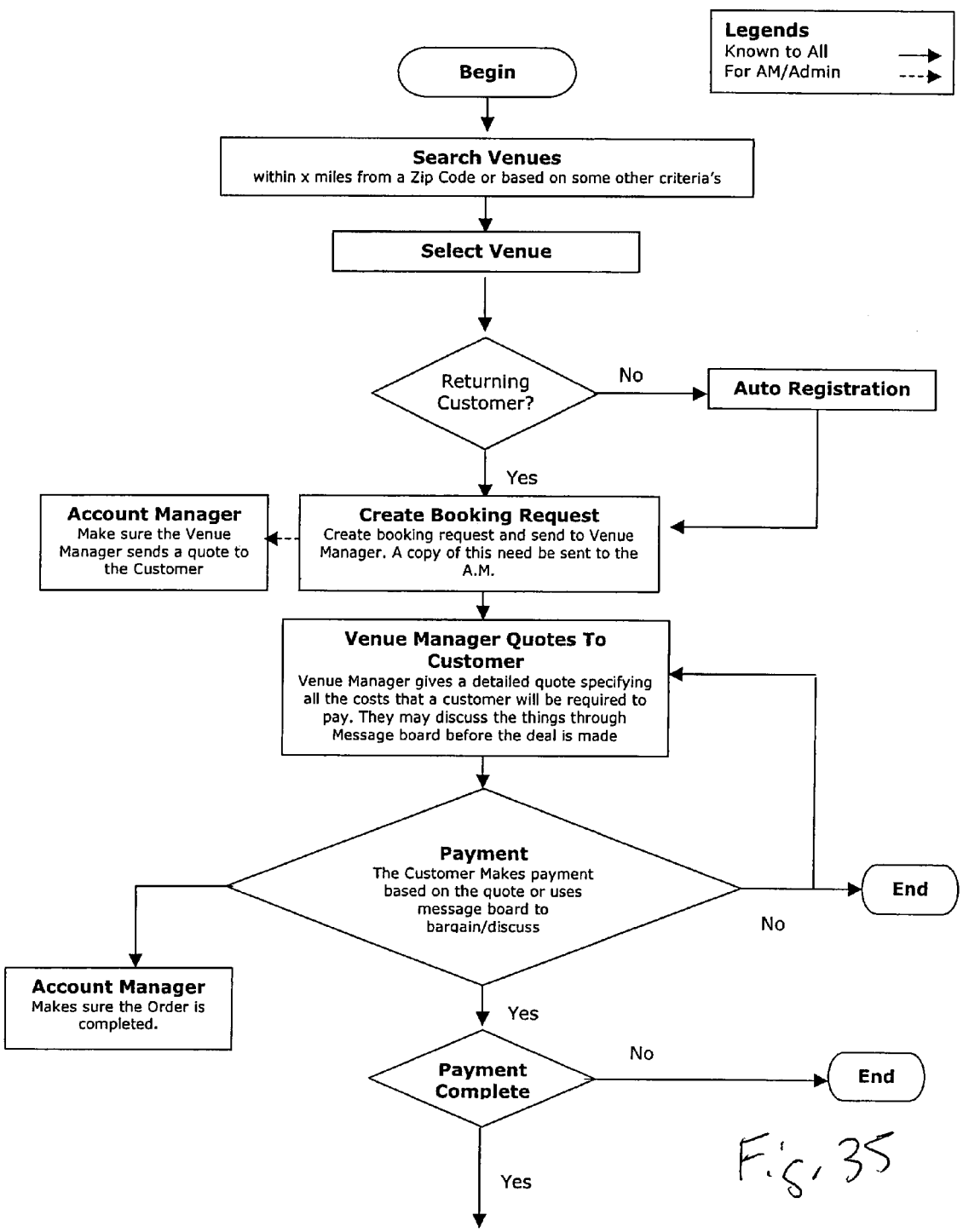
Figure 36:
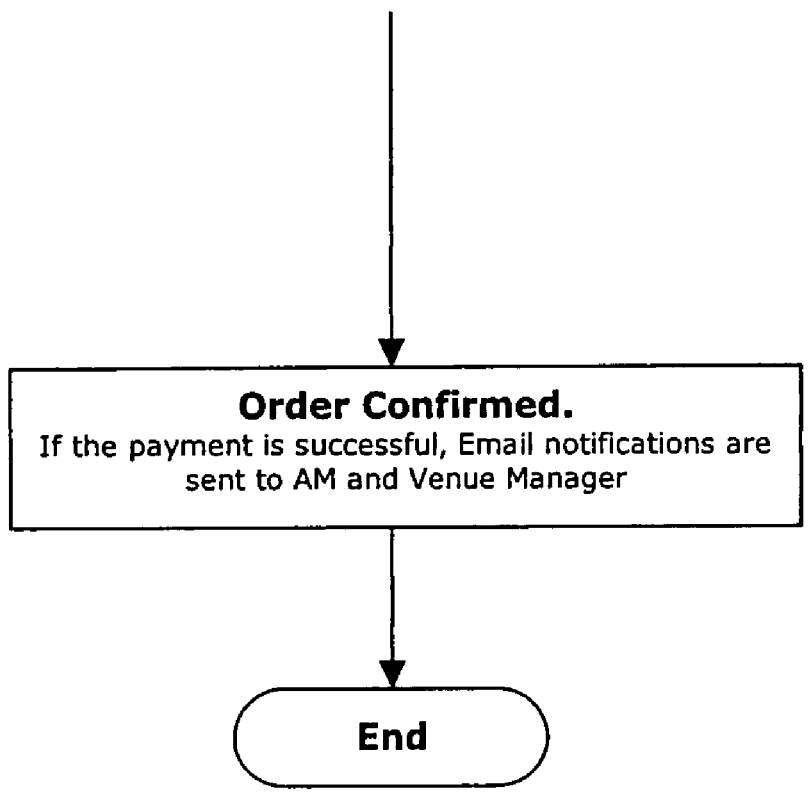
Figure 37:
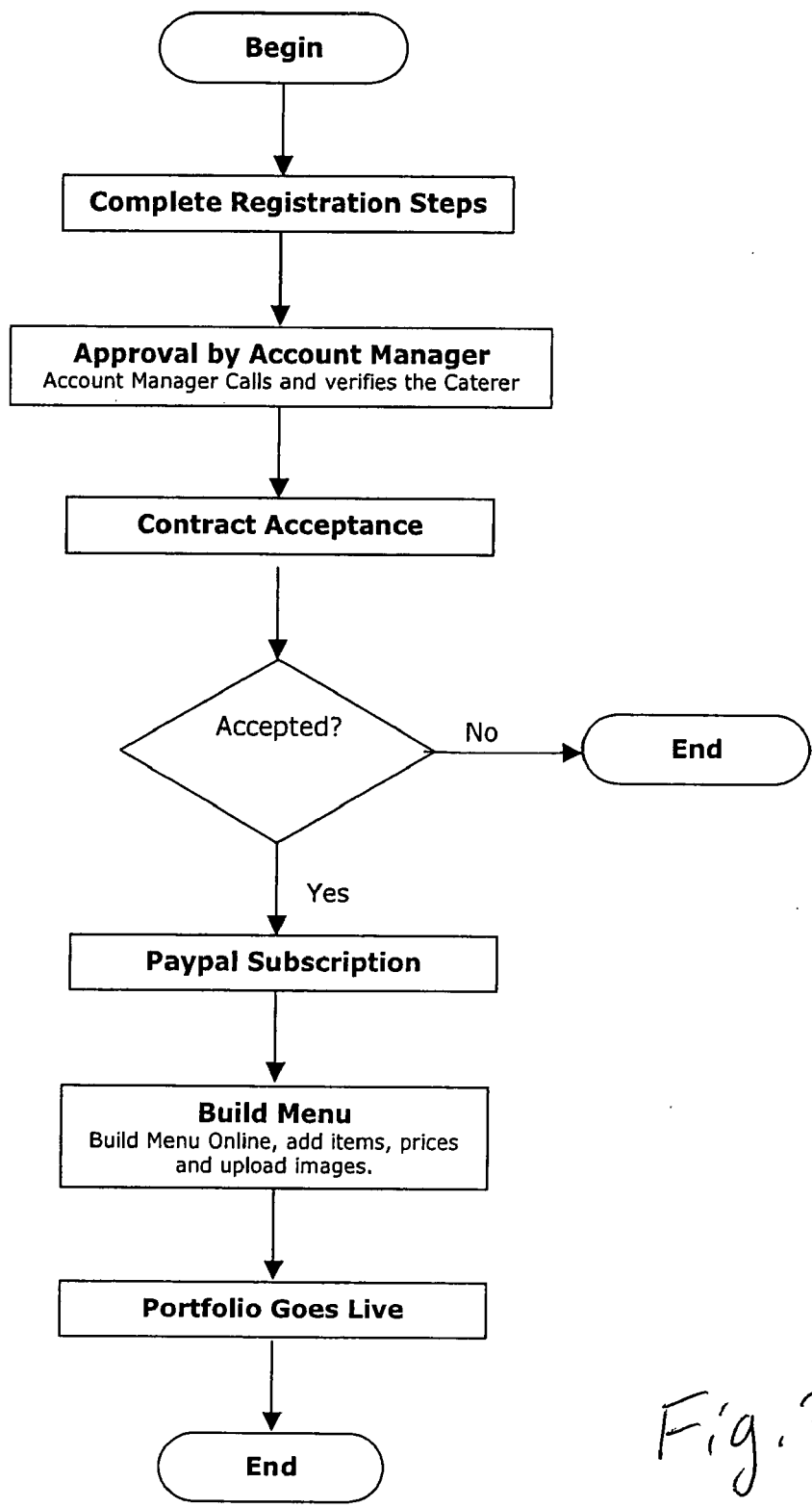
Figure 38:
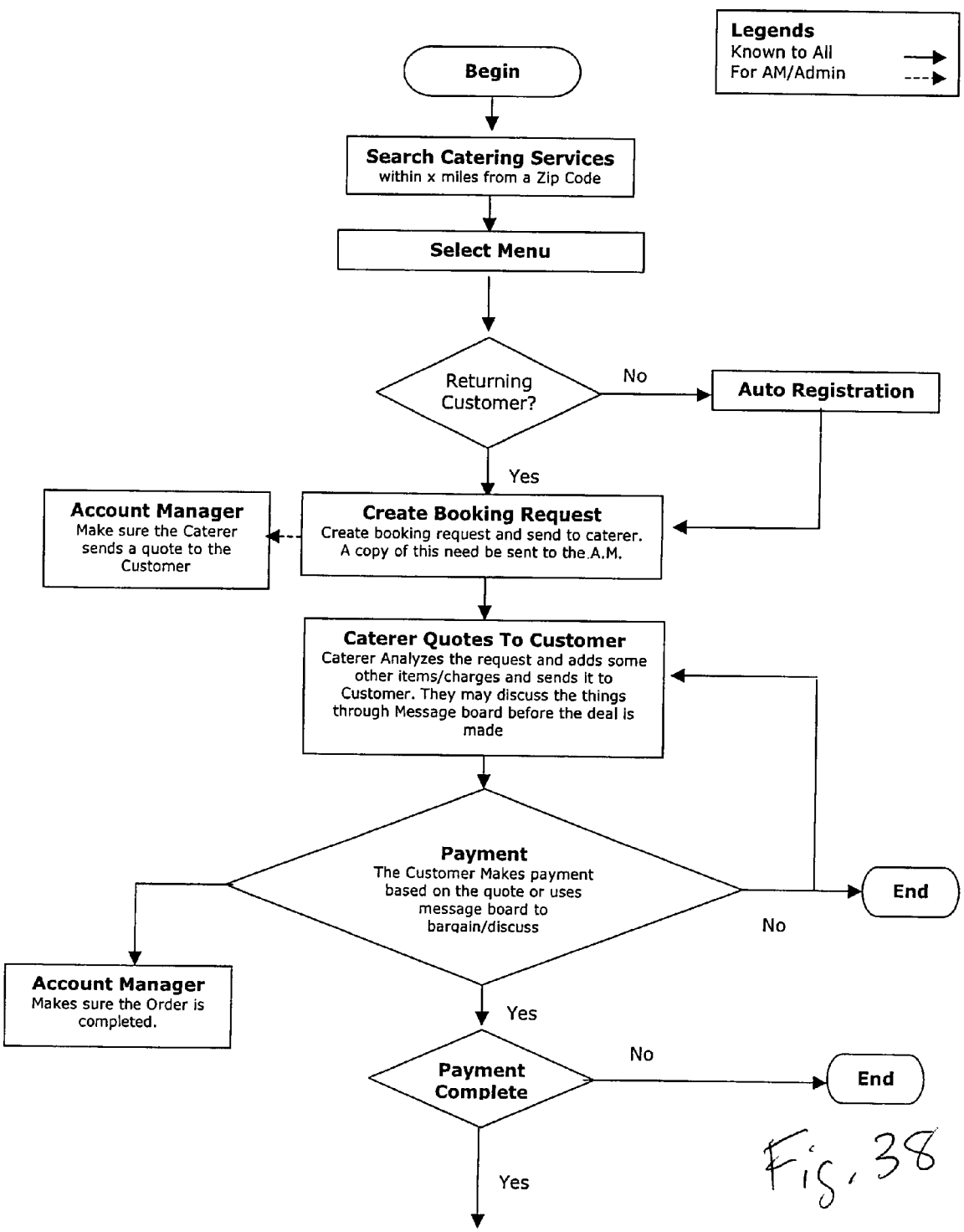
Figure 39:
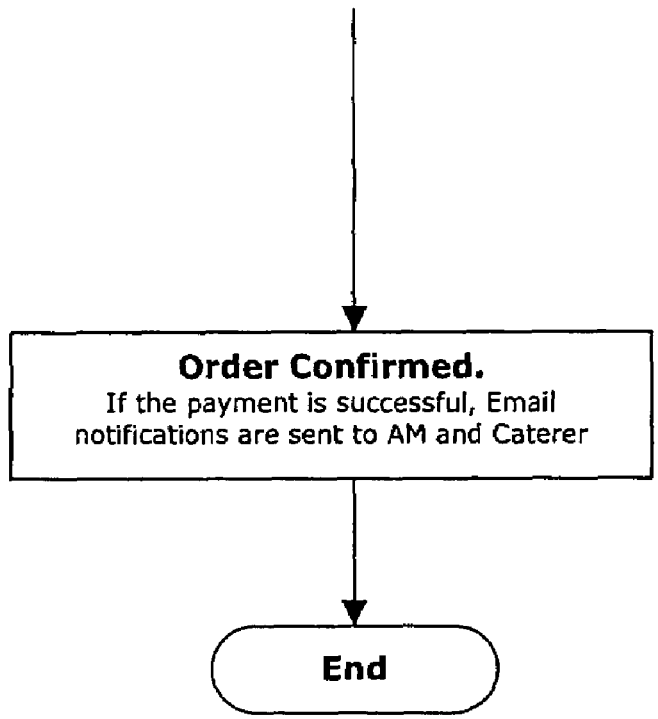
Figure 40:
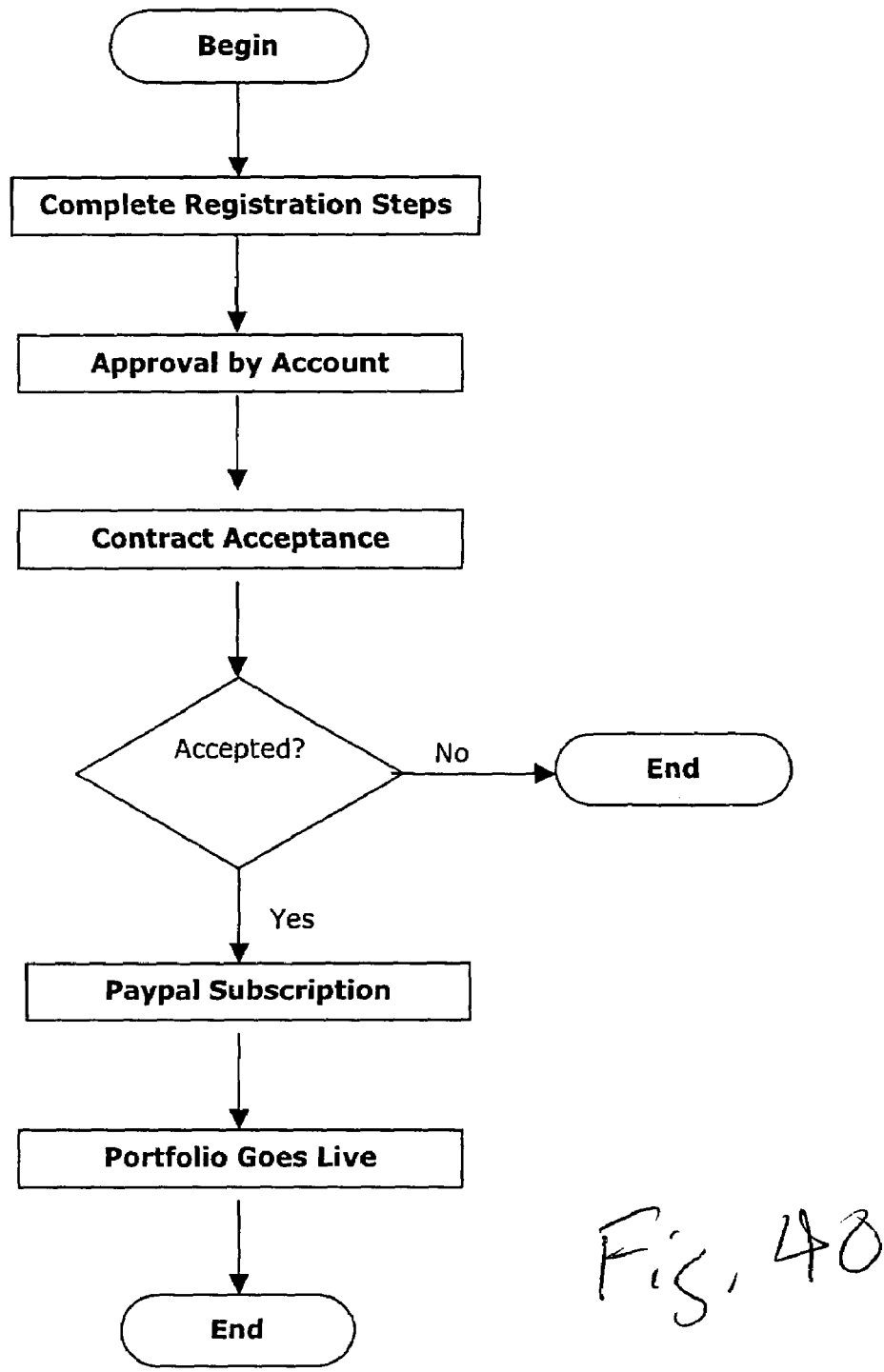
Figure 41:
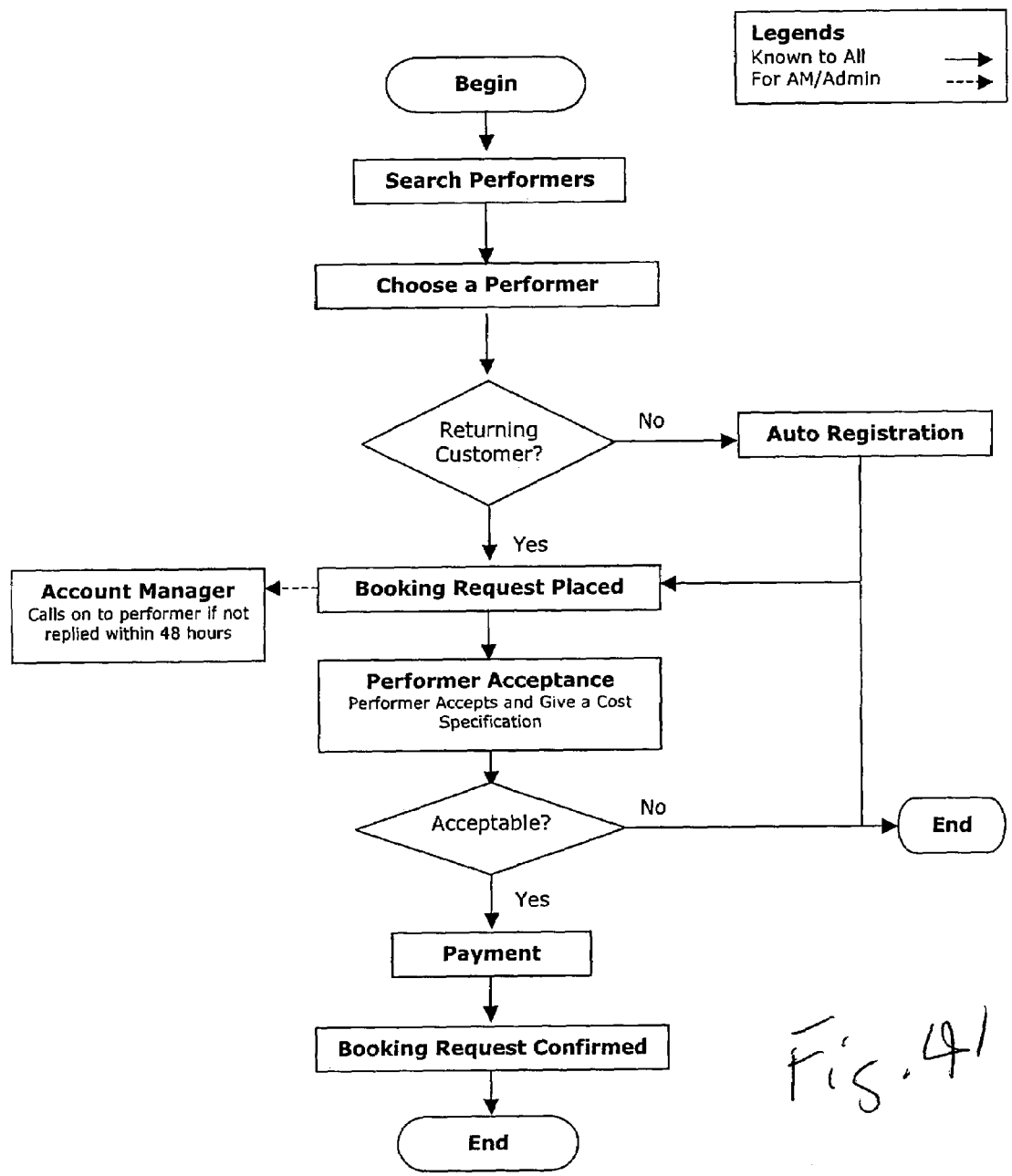
Figure 42:
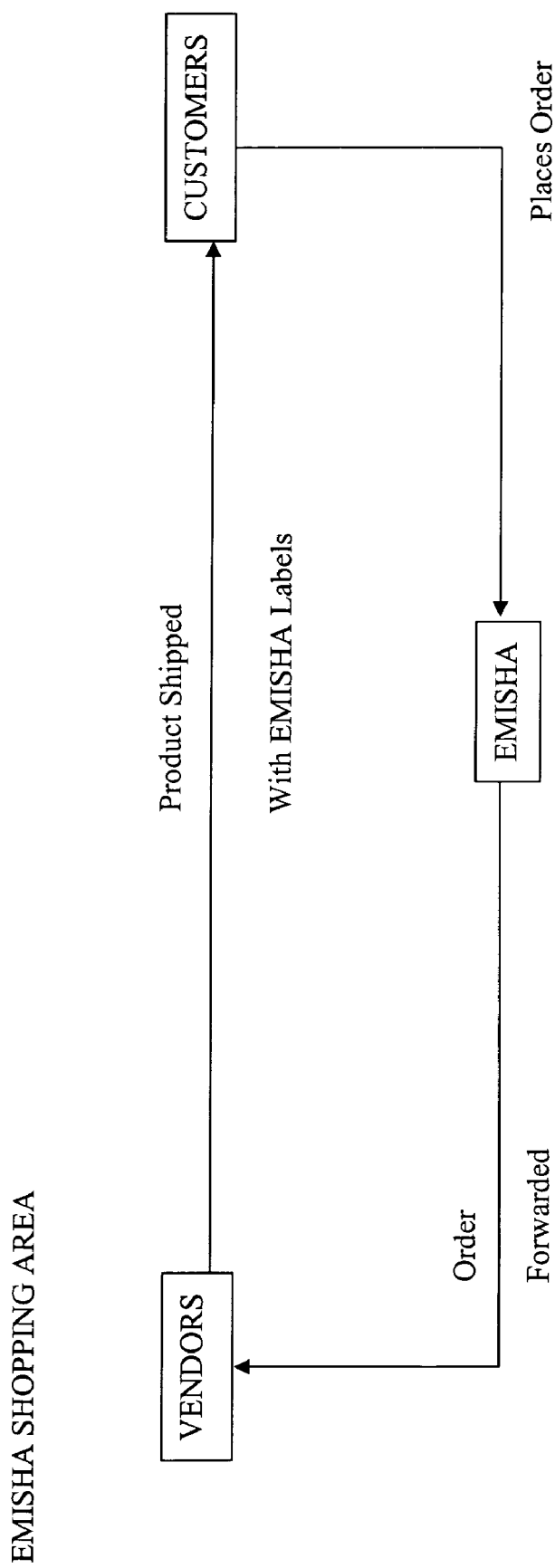
Figure 43:
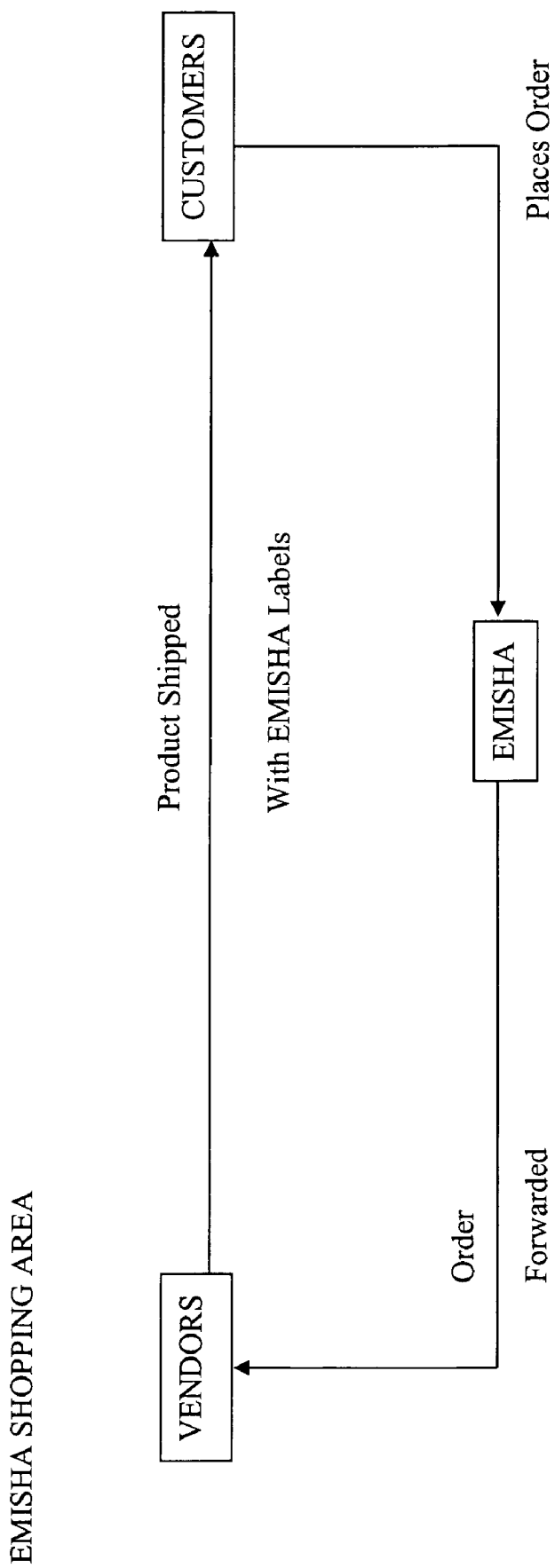
Figure 44:
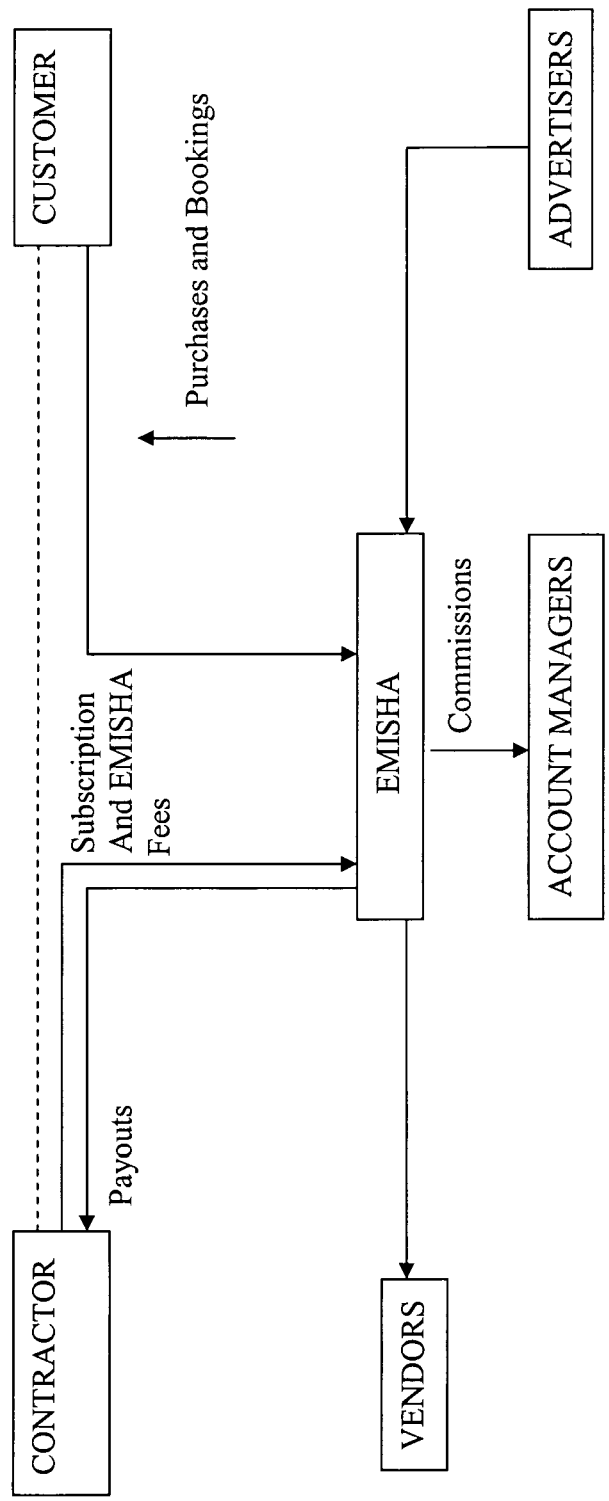
Figure 45:
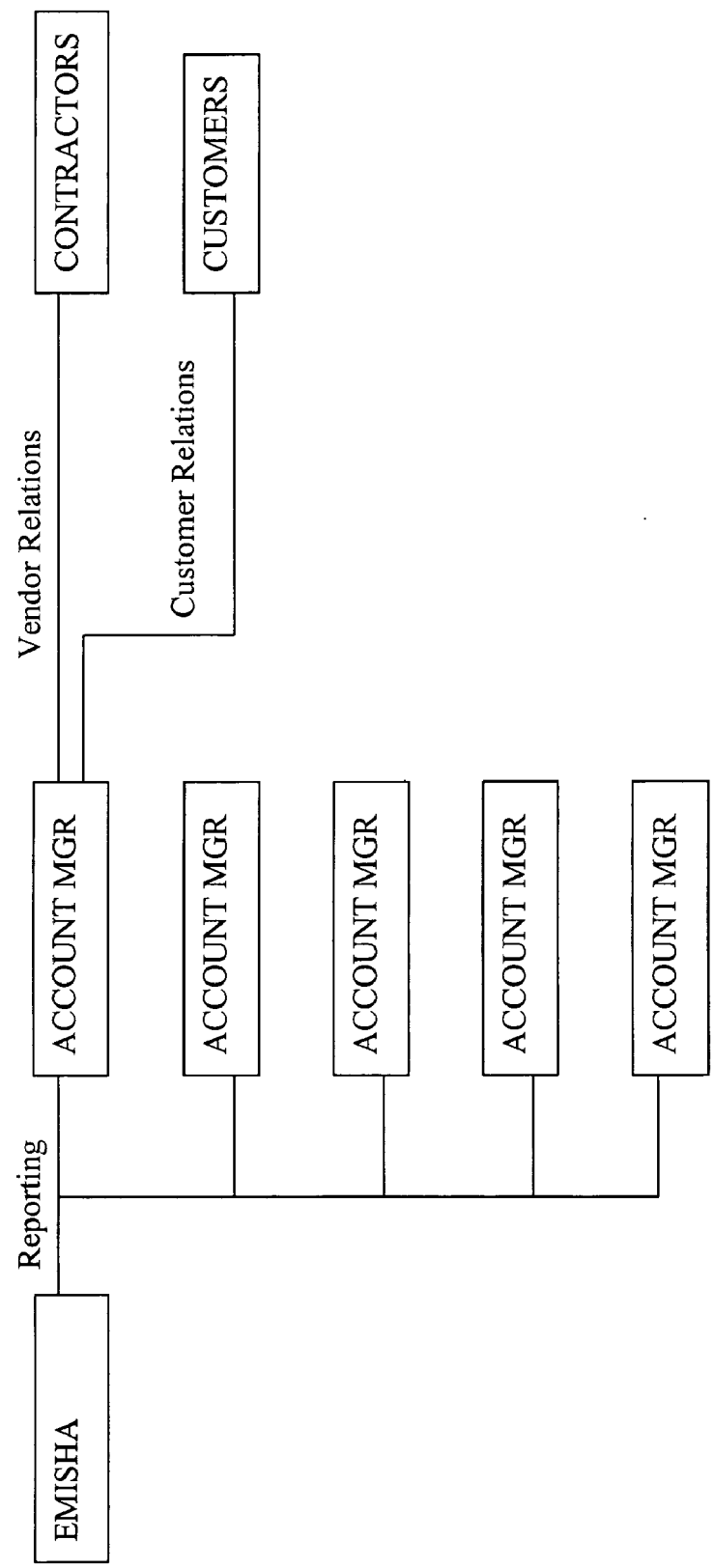
Figure 46:
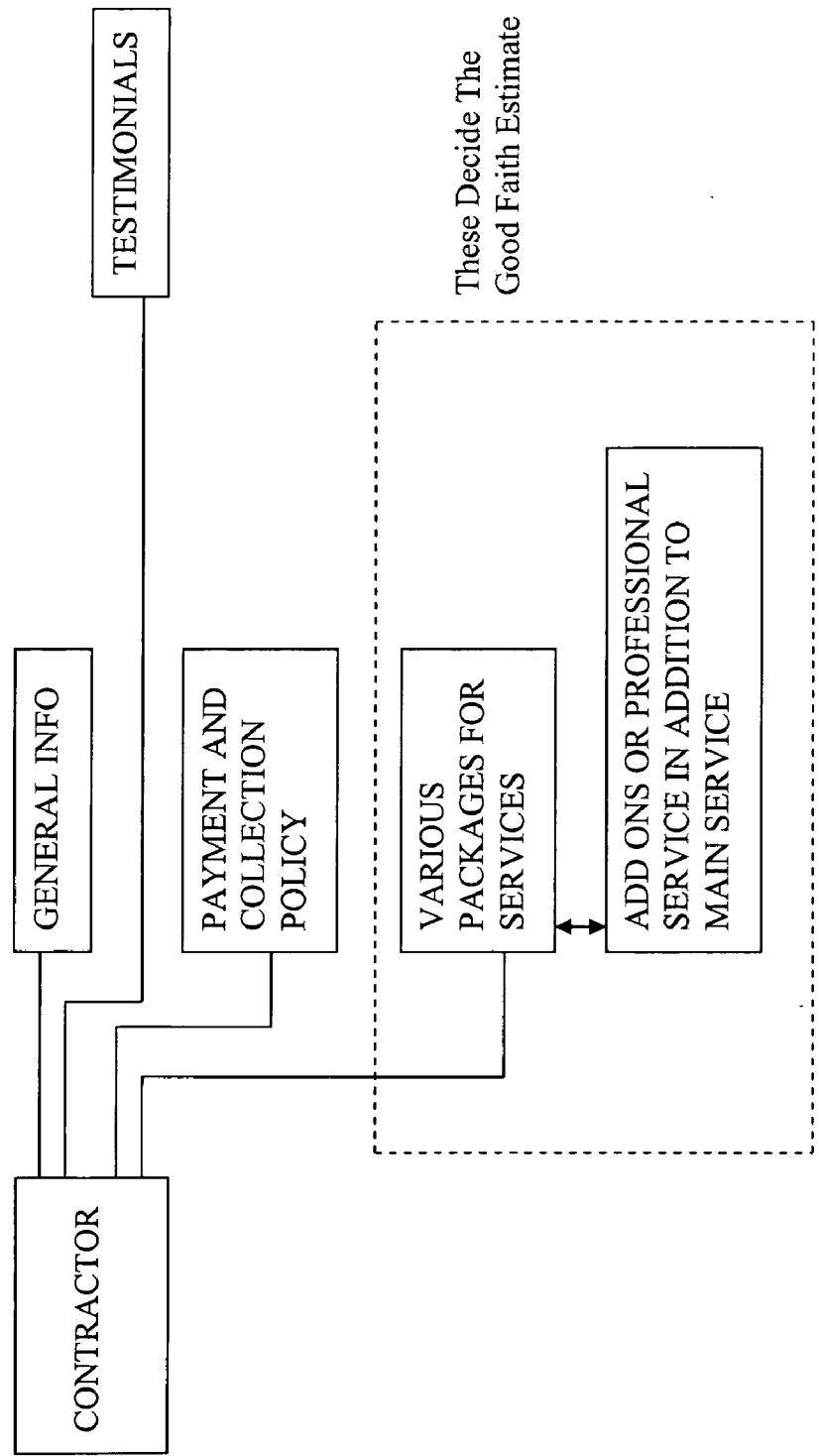
Figure 47:
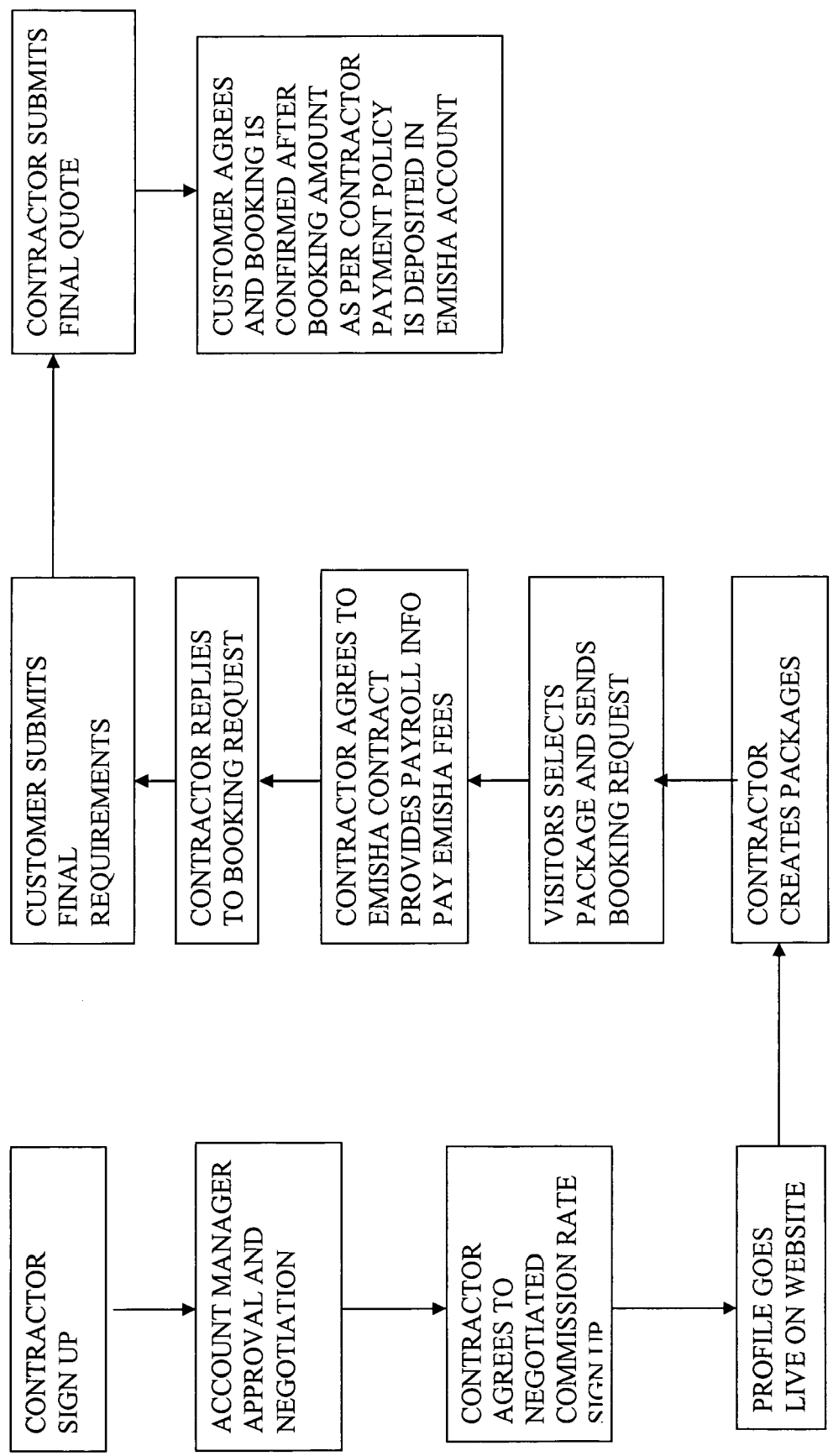

The final screen shot in this group, FIG. 33, shows the website's homepage, through which both clients and vendors initially access the site. The appearance of this page, and any other pages illustrated herein, may of course be freely varied for esthetic conditions and depending on the exact functions provided.

FIGS. 34-41 summarize both registration steps taken by vendors (respectively, venue managers, caterers, and entertainers), and corresponding booking processes carried out by clients of the various vendors. These flowcharts are intended as convenient summaries of the customer-side and vendor-side processes described above, and are not intended to limit the invention in any way.

Figure 48:
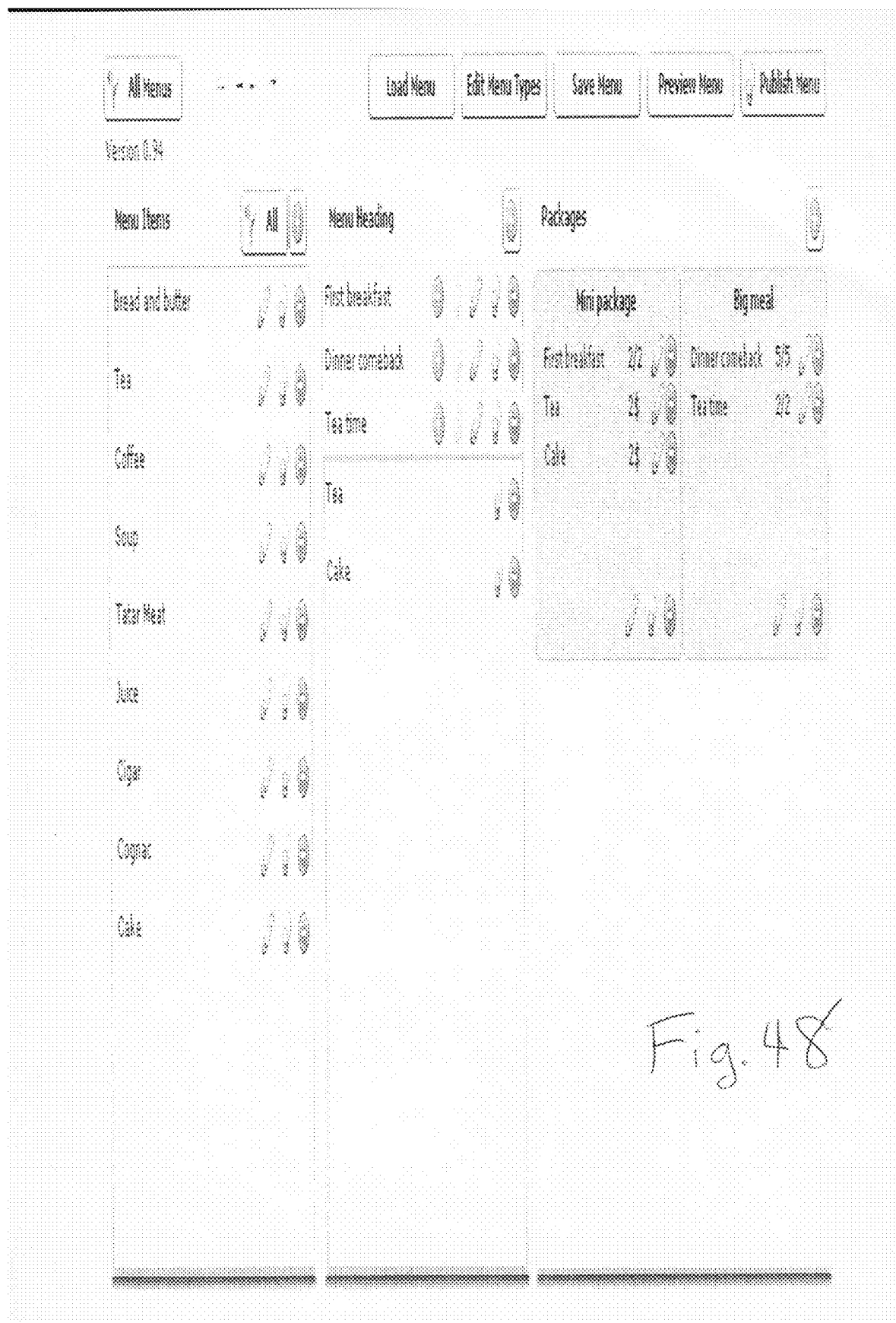
FIG. 48 is a screen shot of a menu creating page that enables a customer to create custom catering packages by selecting individual menu items.

Finally, FIG. 48 shows a tool that enables a vendor to list items that can be selected by the customer to build custom catering packages, rather than simply providing a limited number of pre-assembled packages. Individual menu items such as tea, coffee, soup, and so forth, can easily be selected and included in a custom package by dragging and dropping the items into a representation of the package. The cost of the individual items can then be included in a good faith estimate of the cost of the package and/or event, for review by the event planner before booking the event.

Having thus described preferred embodiments of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

What is claimed is:

1. A method of presenting event-planning clients with a variety of options offered by different vendors through an integrated event-planning website, in which terms and options may be set by vendors using automated forms, comprising the steps of:

providing, in a single integrated website hosted on a computer system, a plurality of vendor templates or forms tailored to particular event planning service industries for enabling a vendor to pre-register with the integrated website by inputting services and goods offered, pricing structures for the goods and services, and contract terms, said industries includes at least catering, transportation, and entertainment industries, wherein said vendor templates or and enables vendors to input information on unique packages of services and goods offered by individual vendors, as well as pricing structures and contract terms offered by the individual vendors;

verifying and activating the vendor account into the integrated website by including a vendor sign-up page that identifies the vendor and permits verification of the vendor credentials and the vendor provided contact information;

presenting said unique packages of services and goods, pricing structures, and contract terms to clients through said single integrated website, and enabling said clients to select vendors for an event, packages offered by selected vendors, and options within said packages based on said presentation of services and goods offered, pricing structures, and contract terms;

communicating information concerning customer-selection of services and goods to said selected vendors;

generating and communicating, though said website, instant good faith estimates for selected packages and options from said selected vendors to said clients;

communicating, through said website, acceptance or rejection of said good faith estimates to said selected vendors.

2. A method as claimed in claim 1, wherein said website further includes an account manager portal through which an account manager recruits vendors, verifies that vendors meet standards of quality, and serves as an event planner and liaison between clients and vendors.

3. A method as claimed in claim 2, wherein the account manager further negotiates commissions that the vendor will be charged when clients select the vendor through the web site.

4. A method as claimed in claim 2, wherein the account manager has additional duties selected from the group consisting of coordinating events, arranging for tasting sessions, and event site tours, keeping vendors abreast of any changes required by a customer, and marketing the website.

5. A method as claimed in claim 1, further comprising the steps of providing the customer with an instant good faith cost estimate from a selected vendor based on detailed information input by the customer, communicating to the vendor a response of the customer to the good faith estimate, communicating to the customer requests for additional details, and communicating to the customer confirmation of availability and final quote.

6. A method as claimed in claim 5, wherein information on which a good faith estimate is based is used by different vendors to generate additional good faith estimates, including good faith estimates for different said industries.

7. A method as claimed in claim 6, further comprising the step of, if the customer accepts the final quote, sending the customer to a payment screen.

8. A method as claimed in claim 7, further comprising the step of enabling the customer to search for venues based on advanced search criteria including room setup, area of venue, services allowed, parking space availability, amenities available, or other criteria related to selection of a venue.

9. A method as claimed in claim 1, wherein said presentation of goods and services offered includes presentation of a list of event types that may be selected by the customer, and a list of venue types that may be selected after selecting an event type, said presentation also enabling the customer to input a date of the event.

10. A method as claimed in claim 1, wherein said detailed lists of services and goods include, for a catering vendor, one or more options selected from the group consisting of types of events, location of catering company, type of cuisine, menu selections, catering style, service options such as selection of waiters or bartending options, types of linens, as well as price and contract terms and other options related to catering.

11. A method as claimed in claim 1, wherein said vendor templates enable a vendor to present lists of individual items for selection by an event planner in order to build custom packages.

12. A method as claimed in claim 11, wherein said individual items are individual dishes for a catering menu.

13. A method as claimed in claim 1, wherein said detailed lists of services and goods include, for an entertainment vendor, one or more options selected from the group consisting of options and packages available by performer, entertainer's rules and regulations, play lists and acts available, deposit policy, payment policies, cancellation policies, and other options relating to entertainment.

14. A method as claimed in claim 13, further comprising the step of presenting performance photos and videos, and testimonials.

15. A method as claimed in claim 1, wherein said detailed lists of services and goods include, for a transportation vendor, one or more options selected from the type of event for which the customer wishes to arrange transportation, type of vehicle, pickup and drop off times, locations, limousine features, rules and regulations, security deposit policy, pricing and availability times.

16. A method as claimed in claim 1, wherein said vendor templates and forms include pages that permit customization of offerings and that take into account requirements of a particular industry.

17. A method as claimed in claim 1, wherein said vendor templates and forms include pages that permit vendors to input contract terms.

18. An integrated event-planning system, in which terms and options may be set by vendors using automated forms, comprising:

software stored in at least one computing device, said software configured with instructions for executing for hosting a single integrated website, said software including a plurality of vendor templates or forms tailored to particular event planning service industries for enabling a vendor to pre-register with the integrated website by inputting services and goods offered, pricing structures for the goods and services, and contract terms, said industries includes at least catering, transportation, and entertainment industries, wherein said vendor templates or forms enable vendors to input information on unique packages of services and goods offered pricing structures and contract terms offered by the individual vendors;

said software, further configured with instructions for executing in at least one computing device verifying and activating the vendor account into the integrated website by including a vendor sign-up page that identifies the vendor and permits verification of the vendor credentials and the vendor provided contact information;

said software further including documents presenting said input services and goods offered, pricing structures, and contract terms to said clients through said single integrated website, said documents enabling clients to select vendors for an event based on said presentation of services and goods offered, pricing structures, and contract terms, said presentation including detailed lists of services and goods organized by categories unique to particular said industries, including options and terms associated with said services and goods, and said software further enabling communication of information concerning customer-selection of services and goods to said selected vendors; generating and communicating instant good faith estimates for selected packages and options from said selected vendors to said clients; and communicating acceptance or rejection of said good faith estimates to said selected vendors.

* * * * *